US008855278B2

(12) United States Patent
Johnson, Jr. et al.

(10) Patent No.: US 8,855,278 B2
(45) Date of Patent: *Oct. 7, 2014

(54) DIAL UP TELEPHONE CONFERENCING SYSTEM CONTROLLED BY AN ONLINE COMPUTER NETWORK

(75) Inventors: Clark E. Johnson, Jr., Madison, WI (US); Richard J. Solomon, Monson, MA (US); Tice F. DeYoung, Fairfax, VA (US); David J. Farber, Pittsburgh, PA (US)

(73) Assignee: Xugave Holding DE LLC, Dover, DE (US)

( * ) Notice: Subject to any disclaimer, the term of this patent is extended or adjusted under 35 U.S.C. 154(b) by 266 days.

This patent is subject to a terminal disclaimer.

(21) Appl. No.: 13/308,027

(22) Filed: Nov. 30, 2011

(65) Prior Publication Data

US 2012/0140909 A1    Jun. 7, 2012

Related U.S. Application Data

(63) Continuation of application No. 12/410,269, filed on Mar. 24, 2009, now Pat. No. 8,077,844, which is a
(Continued)

(51) Int. Cl.
*H04M 11/00* (2006.01)
*H04M 3/56* (2006.01)
*H04M 7/00* (2006.01)
*H04M 7/06* (2006.01)

(52) U.S. Cl.
CPC .............. *H04M 3/56* (2013.01); *H04M 3/563* (2013.01); *H04M 2203/5027* (2013.01); *H04M 2203/5009* (2013.01); *H04M 3/567* (2013.01); *H04M 2242/16* (2013.01); *H04M 11/00* (2013.01); *H04M 2207/12* (2013.01); *H04M 2203/5054* (2013.01); *H04M 7/0009* (2013.01); *H04M 7/06* (2013.01)
USPC ...................... 379/93.21; 379/90.01; 370/352

(58) Field of Classification Search
USPC .............................. 379/90.01, 93.21; 370/352
See application file for complete search history.

(56) References Cited

U.S. PATENT DOCUMENTS

| 4,475,189 A | 10/1984 | Herr et al. |
| 4,788,718 A | 11/1988 | McNabb |

(Continued)

FOREIGN PATENT DOCUMENTS

| CA | 2 216 035 A1 | 3/1999 |
| CA | 2 303 392 C | 4/2004 |

(Continued)

OTHER PUBLICATIONS

Ahuja, S.R., and J.R. Ensor, "Coordination and Control of Multimedia Conferencing," IEEE Communications Magazine 30(5):38-43, May 1992.

(Continued)

*Primary Examiner* — Stella Woo
(74) *Attorney, Agent, or Firm* — Christensen O'Connor Johnson Kindness PLLC

(57) ABSTRACT

In a telephone conferencing system, a digital communication network such as the Internet is used to establish and control the telephone connections between multiple conferees with the telephone network being the means of exchanging verbal information. Each conferee may have a computer connected to the digital network, and each has an independent telephone instrument connected to the public switched telephone network. An in-charge conferee utilizes his computer containing appropriate software to initiate the conference and to control the participation of the conferees. The in-charge conferee sends digital control signals to a switch interface controlling a telephone switch as a gateway to the telephone network using SS7 control signals. These SS7 control signals include the commands by which the conferee telephones are rung up, brought on line, or dropped from the conference.

20 Claims, 4 Drawing Sheets

Related U.S. Application Data continuation of application No. 10/705,571, filed on Nov. 10, 2003, now Pat. No. 7,522,542, which is a continuation of application No. 10/087,671, filed on Mar. 1, 2002, now Pat. No. 6,661,779, which is a continuation of application No. 09/819,079, filed on Apr. 30, 2001, now Pat. No. 6,480,474, which is a continuation of application No. 09/587,080, filed on Jun. 3, 2000, now Pat. No. 6,266,328, which is a continuation-in-part of application No. 09/212,786, filed on Dec. 16, 1998, now Pat. No. 6,072,780, which is a continuation-in-part of application No. 08/918,564, filed on Aug. 22, 1997, now abandoned.

(60) Provisional application No. 60/024,592, filed on Aug. 26, 1996.

(56) References Cited

U.S. PATENT DOCUMENTS

| | | |
|---|---|---|
| 4,796,293 A | 1/1989 | Blinken |
| 4,866,758 A | 9/1989 | Heinzelmann |
| 4,872,160 A | 10/1989 | Hemmady |
| 4,872,197 A | 10/1989 | Pemmaraju |
| 4,945,219 A | 7/1990 | Tanaka |
| 4,958,341 A | 9/1990 | Hemmady |
| 4,965,788 A | 10/1990 | Newman |
| 5,222,085 A | 6/1993 | Newman |
| 5,245,603 A | 9/1993 | Newman |
| 5,247,571 A | 9/1993 | Kay |
| 5,341,374 A | 8/1994 | Lewen |
| 5,367,518 A | 11/1994 | Newman |
| 5,375,068 A | 12/1994 | Palmer |
| 5,396,491 A | 3/1995 | Newman |
| 5,410,754 A | 4/1995 | Klotzbach |
| 5,425,084 A | 6/1995 | Brinskele |
| 5,434,913 A | 7/1995 | Tung |
| 5,438,568 A | 8/1995 | Weisser, Jr. |
| 5,471,318 A | 11/1995 | Ahuja |
| 5,475,732 A | 12/1995 | Pester, III |
| 5,483,588 A | 1/1996 | Eaton |
| 5,490,247 A | 2/1996 | Tung |
| 5,506,832 A | 4/1996 | Arshi |
| 5,515,296 A | 5/1996 | Agarwal |
| 5,526,353 A | 6/1996 | Henley |
| 5,533,110 A | 7/1996 | Pinard |
| 5,546,452 A | 8/1996 | Andrews |
| 5,559,875 A | 9/1996 | Bieselin |
| 5,586,177 A | 12/1996 | Farris |
| 5,608,786 A | 3/1997 | Gordon |
| 5,619,555 A | 4/1997 | Fenton |
| 5,629,978 A | 5/1997 | Blumhardt |
| 5,631,948 A | 5/1997 | Bartholomew |
| 5,659,542 A | 8/1997 | Bell |
| 5,661,782 A | 8/1997 | Bartholomew |
| 5,661,790 A | 8/1997 | Hsu |
| 5,664,010 A | 9/1997 | Walker |
| 5,664,102 A | 9/1997 | Faynberg |
| 5,668,863 A | 9/1997 | Bieselin |
| 5,680,442 A | 10/1997 | Bartholomew |
| 5,689,553 A | 11/1997 | Ahuja |
| 5,694,463 A | 12/1997 | Christie |
| 5,706,286 A | 1/1998 | Reiman |
| 5,712,907 A | 1/1998 | Wegner |
| 5,724,355 A | 3/1998 | Bruno |
| 5,726,984 A | 3/1998 | Kubler |
| 5,737,404 A | 4/1998 | Segal |
| 5,751,706 A | 5/1998 | Land |
| 5,765,108 A | 6/1998 | Martin |
| 5,774,695 A | 6/1998 | Autrey |
| 5,790,548 A | 8/1998 | Sistanizadeh |
| 5,793,771 A | 8/1998 | Darland |
| 5,793,839 A | 8/1998 | Farris |
| 5,812,639 A | 9/1998 | Bartholomew |
| 5,812,652 A | 9/1998 | Jodoin |
| 5,818,836 A | 10/1998 | DuVal |
| 5,852,656 A | 12/1998 | Sato |
| 5,862,208 A | 1/1999 | McLampy |
| 5,870,565 A | 2/1999 | Glitho |
| 5,878,130 A | 3/1999 | Andrews |
| 5,883,891 A | 3/1999 | Williams |
| 5,883,964 A | 3/1999 | Alleman |
| 5,884,032 A | 3/1999 | Bateman |
| 5,896,500 A | 4/1999 | Ludwig |
| 5,898,839 A | 4/1999 | Berteau |
| 5,912,887 A | 6/1999 | Sehgal |
| 5,916,302 A | 6/1999 | Dunn |
| 5,917,817 A | 6/1999 | Dunn |
| 5,923,659 A | 7/1999 | Curry |
| 5,926,535 A | 7/1999 | Reynolds |
| 5,933,490 A | 8/1999 | White |
| 5,940,479 A | 8/1999 | Guy |
| 5,943,414 A | 8/1999 | McIntee |
| 5,949,762 A | 9/1999 | Green |
| 5,953,405 A | 9/1999 | Miloslavsky |
| 5,963,632 A | 10/1999 | Miloslavsky |
| 5,987,102 A | 11/1999 | Elliott |
| 5,987,103 A | 11/1999 | Martino |
| 5,995,605 A | 11/1999 | Madoch |
| 5,995,608 A | 11/1999 | Detampel, Jr. |
| 5,995,614 A | 11/1999 | Miloslavsky |
| 6,009,469 A | 12/1999 | Mattaway |
| 6,026,087 A | 2/2000 | Mirashrafi |
| 6,031,836 A | 2/2000 | Haserodt |
| 6,035,214 A | 3/2000 | Henderson |
| 6,069,890 A | 5/2000 | White |
| 6,072,780 A | 6/2000 | Johnson, Jr. |
| 6,075,783 A | 6/2000 | Voit |
| 6,075,796 A | 6/2000 | Katseff |
| 6,078,579 A | 6/2000 | Weingarten |
| 6,081,591 A | 6/2000 | Skoog |
| 6,084,956 A | 7/2000 | Turner |
| 6,091,808 A | 7/2000 | Wood |
| 6,097,804 A | 8/2000 | Gilbert |
| 6,101,182 A | 8/2000 | Sistanizadeh |
| 6,101,246 A | 8/2000 | Heinmiller |
| 6,122,255 A | 9/2000 | Bartholomew |
| 6,125,113 A | 9/2000 | Farris |
| 6,128,285 A | 10/2000 | Buhler |
| 6,130,933 A | 10/2000 | Miloslavsky |
| 6,134,235 A | 10/2000 | Goldman |
| 6,137,792 A | 10/2000 | Jonas |
| 6,144,670 A | 11/2000 | Sponaugle |
| 6,147,988 A | 11/2000 | Bartholomew |
| 6,148,068 A | 11/2000 | Lowery |
| 6,154,445 A | 11/2000 | Farris |
| 6,167,432 A | 12/2000 | Jiang |
| 6,172,675 B1 | 1/2001 | Ahmad |
| 6,178,181 B1 | 1/2001 | Glitho |
| 6,181,786 B1 | 1/2001 | Detampel, Jr. |
| 6,181,788 B1 | 1/2001 | Miloslavsky |
| 6,185,204 B1 | 2/2001 | Voit |
| 6,195,425 B1 | 2/2001 | Farris |
| 6,198,738 B1 | 3/2001 | Chang |
| 6,201,804 B1 | 3/2001 | Kikinis |
| 6,201,863 B1 | 3/2001 | Miloslavsky |
| 6,215,858 B1 | 4/2001 | Bartholomew |
| 6,222,826 B1 | 4/2001 | Faynberg |
| 6,226,286 B1 | 5/2001 | Danne |
| 6,243,373 B1 | 6/2001 | Turock |
| 6,266,328 B1 | 7/2001 | Johnson, Jr. |
| 6,278,707 B1 | 8/2001 | MacMillan |
| 6,282,193 B1 | 8/2001 | Hluchyj |
| 6,285,745 B1 | 9/2001 | Bartholomew |
| 6,324,183 B1 | 11/2001 | Miller |
| 6,324,264 B1 | 11/2001 | Wiener |
| 6,330,321 B2 | 12/2001 | Detampel, Jr. |
| 6,333,931 B1 | 12/2001 | LaPier |
| 6,337,858 B1 | 1/2002 | Petty |
| 6,339,593 B1 | 1/2002 | Kikinis |
| 6,377,576 B1 | 4/2002 | Zwick |
| 6,381,238 B1 | 4/2002 | Hluchyj |
| 6,392,760 B1 | 5/2002 | Ahuja |

(56) References Cited

U.S. PATENT DOCUMENTS

| | | |
|---|---|---|
| 6,418,214 B1 | 7/2002 | Smythe |
| 6,430,282 B1 | 8/2002 | Bannister |
| 6,438,218 B1 | 8/2002 | Farris |
| 6,442,169 B1 | 8/2002 | Lewis |
| 6,445,694 B1 | 9/2002 | Swartz |
| 6,449,344 B1 | 9/2002 | Goldfinger |
| 6,452,925 B1 | 9/2002 | Sistanizadeh |
| 6,453,034 B1 | 9/2002 | Donovan |
| 6,456,615 B1 | 9/2002 | Kikinis |
| 6,459,449 B1 | 10/2002 | Juen |
| 6,480,474 B2 | 11/2002 | Johnson, Jr. |
| 6,501,740 B1 | 12/2002 | Sun |
| 6,584,093 B1 | 6/2003 | Salama |
| 6,628,767 B1 | 9/2003 | Wellner |
| 6,650,631 B1 | 11/2003 | Benash |
| 6,661,779 B2 | 12/2003 | Johnson, Jr. |
| 6,807,185 B1 | 10/2004 | Bell |
| 6,816,469 B1 | 11/2004 | Kung |
| 6,853,636 B1 | 2/2005 | Merchant |
| 6,870,827 B1 | 3/2005 | Voit |
| 6,904,060 B2 | 6/2005 | Nelson |
| 7,266,186 B1 | 9/2007 | Henderson |
| 7,522,542 B2 | 4/2009 | Johnson, Jr. |
| 2001/0016038 A1 | 8/2001 | Sammon |
| 2001/0040885 A1 | 11/2001 | Jonas |
| 2002/0064149 A1 | 5/2002 | Elliott |
| 2003/0007622 A1 | 1/2003 | Kalmanek, Jr. |
| 2003/0193933 A1 | 10/2003 | Jonas |
| 2008/0013531 A1 | 1/2008 | Elliott |
| 2008/0025295 A1 | 1/2008 | Elliott |

FOREIGN PATENT DOCUMENTS

| | | |
|---|---|---|
| EP | 0 716 533 A2 | 6/1996 |
| EP | 0 964 567 A2 | 12/1999 |
| EP | 0 969 687 A1 | 1/2000 |
| EP | 0 847 178 B1 | 1/2004 |
| WO | 99/41890 A2 | 8/1999 |
| WO | 01/16038 A1 | 3/2001 |
| WO | 01/72022 A1 | 9/2001 |

OTHER PUBLICATIONS

Appendix in Support of Caritas' Opening Claim Construction Brief, Jun. 9, 2006, in *Caritas Technologies, Inc.* v. *Comcast Corporation*, U.S. District Court for the Eastern District of Texas Marshall Division, 2:05-CV-339-DF.
Appendix in Support of Caritas' Reply Claim Construction Brief, Jun. 30, 2006, in *Caritas Technologies, Inc.* v. *Comcast Corporation*, U.S. District Court for the Eastern District of Texas Marshall Division, 2:05-CV-339-DF.
"AT&T Goes Live With Multimedia Nets," AT&T, Oct. 1995.
Brief of Appellees, Mar. 5, 2007, in *Caritas Technologies, Inc.* v. *Comcast Corporation*, U.S. Court of Appeals for The Federal Circuit, 2:05-CV-339-DF.
Brief of Plaintiff Appellant Caritas Technologies, Inc., Jan. 19, 2007, in *Caritas Technologies, Inc.* v. *Comcast Corporation*, U.S. Court of Appeals for The Federal Circuit, 2:05-CV-339-DF.
Caritas' Reply Claim Construction Brief, Jun. 30, 2006, in *Caritas Technologies, Inc.* v. *Comcast Corporation*, U.S. District Court for the Eastern District of Texas Marshall Division, 2:05-CV-339-DF.
Claim Construction Order, Oct. 18, 2006, in *Caritas Technologies, Inc.* v. *Comcast Corporation*, U.S. District Court for the Eastern District of Texas Marshall Division, 2:05-CV-339-DF.
Clark, W.J., "The European "MIAS" System for ISDN Multimedia Conferencing," 4th IEEE ComSoc International Workshop on Multimedia Communications, Apr. 1992, pp. 14-27.
Comcast Corporation's Second Supplemental Response to Caritas Technologies, Inc. Interrogatory No. 12, Aug. 22, 2006, in *Caritas Technologies, Inc.* v. *Comcast Corporation*, U.S. District Court for the Eastern District of Texas Marshall Division, 2:05-CV-339-DF.

"DEC CIT Server 100/500 Installation and Configuration (ULTRIX)," Digital Equipment Corporation (DEC), Oct. 1991.
DEC CIT: "Applications Interface for ULTRIX Programming Reference (E-9 to F-22)," Oct. 1991.
"DEC Computer Integrated Telephony: Integrated Voice/Data Solutions—Merging Two Powerful Technologies in High-Payback Business Applications," Digital Equipment Corporation (DEC) 1992.
Declaration of Asim M. Bhansali in Support of Defendant Comcast Corporation's Claim Construction Brief, Jun. 23, 2006, in *Caritas Technologies, Inc.* v. *Comcast Corporation*, U.S. District Court for the Eastern District of Texas Marshall Division, 2:05-CV-339-DF.
Declaration of Leonard J. Forys in Support of Caritas' Opening Claim Construction Brief, Jun. 9, 2006, in *Caritas Technologies, Inc.* v. *Comcast Corporation*, U.S. District Court for the Eastern District of Texas Marshall Division, 2:05-CV-339-DF.
Declaration of Leonard J. Forys in Support of Caritas' Reply Claim Construction Brief, Jun. 30, 2006, in *Caritas Technologies, Inc.* v. *Comcast Corporation*, U.S. District Court for the Eastern District of Texas Marshall Division, 2:05-CV-339-DF.
Defendant Comcast Corporation's Claim Construction Brief, Jun. 23, 2006, in *Caritas Technologies, Inc.* v. *Comcast Corporation*, U.S. District Court for the Eastern District of Texas Marshall Division, 2:05-CV-339-DF.
Defendant Comcast Corporation's Fifth Supplemental Response to Plaintiff Caritas Technologies, Inc. Interrogatory No. 8, Aug. 22, 2006, in *Caritas Technologies, Inc.* v. *Comcast Corporation*, U.S. District Court for the Eastern District of Texas Marshall Division, 2:05-V-339-DF.
Defendant Comcast Corporation's First Supplemental Response to Caritas Technologies, Inc. Interrogatory No. 12, Aug. 9, 2006, in *Caritas Technologies, Inc.* v. *Comcast Corporation*, U.S. Court of Appeals for The Federal Circuit, 2:05-CV-339-DF.
Defendant Comcast Corporation's Fourth Set of Supplemental Responses to Plaintiff Caritas Technologies, Inc.'s First Set of Interrogatories, May 12, 2006, in *Caritas Technologies, Inc.* v. *Comcast Corporation*, U.S. District Court for the Eastern District of Texas Marshall Division, 2:05-CV-339-DF.
Defendant Comcast Corporation's Preliminary Construction and Citations to Extrinsic Evidence for Claim Terms from the '779 Patent, Jan. 9, 2006, in *Caritas Technologies, Inc.* v. *Comcast Corporation*, U.S. District Court for the Eastern District of Texas Marshall Division, 2:05-CV-339-DF.
Defendant Comcast Corporation's Preliminary Invalidity Contentions in *Caritas Technologies, Inc.* v. *Comcast Corporation*, Jan. 12, 2006, U.S. District Court for the Eastern District of Texas Marshal Division, 2:05-CV-339-DF.
Defendant Comcast Corporation's Responses to Plaintiff Caritas Technologies, Inc.'s First Set of Interrogatories, Nov. 28, 2005, in *Caritas Technologies, Inc.* v. *Comcast Corporation*, U.S. District Court for the Eastern District of Texas Marshall Division, 2:05-CV-339-DF.
Defendant Comcast Corporation's Responses to Plaintiff Caritas Technologies, Inc.'s Second Set of Interrogatories, Mar. 22, 2006, in *Caritas Technologies, Inc.* v. *Comcast Corporation*, U.S. District Court for the Eastern District of Texas Marshall Division, 2:05-CV-339-DF.
Defendant Comcast Corporation's Responses to Plaintiff Caritas Technologies, Inc.'s Third Set of Interrogatories, Jun. 12, 2006, in *Caritas Technologies, Inc.* v. *Comcast Corporation*, U.S. District Court for the Eastern District of Texas Marshall Division, 2:05-CV-339-DF.
Defendant Comcast Corporation's Second Supplemental Response to Plaintiff Caritas Technologies, Inc. Interrogatory No. 7, Oct. 19, 2006, in *Caritas Technologies, Inc.* v. *Comcast Corporation*, U.S. District Court for the Eastern District of Texas Marshall Division, 2:05-CV-339-DF.
Defendant Comcast Corporation's Supplemental Response to Plaintiff Caritas Technologies, Inc. Interrogatory No. 13, Oct. 18, 2006, in *Caritas Technologies, Inc.* v. *Comcast Corporation*, U.S. District Court for the Eastern District of Texas Marshall Division, 2:05-CV-339-DF.
Defendant Comcast Corporation's Third Set of Supplemental Responses to Plaintiff Caritas Technologies, Inc.'s First Set of Inter-

(56) References Cited

OTHER PUBLICATIONS rogatories, Apr. 14, 2006, in *Caritas Technologies, Inc. v. Comcast Corporation*, U.S. District Court for the Eastern District of Texas Marshall Division, 2:05-CV-339-DF.
Expert Report of Mark E. Nusbaum, Sep. 28, 2006, in *Caritas Technologies, Inc. v. Comcast Corporation*, U.S. District Court for the Eastern District of Texas Marshall Division, 2:05-CV-339-DF.
Final Judgment of Non-Infringement signed by Judge Folsom, Nov. 9, 2006, in *Caritas Technologies, Inc. v. Comcast Corporation*, U.S. District Court for the Eastern District of Texas Marshall Division, 2:05-CV-339-DF.
Greene, T., "Voice to Get Free Ride Fom Frame," Network World, Jan. 29, 1996, 1 page.
IEEE Communications Society Editorial Staff 1983, Dec. 1993.
"Internet Telephony: Lucent Technologies Announces Click-to-Dial Web Services and Intelligent Network Capabilities for Voice Over Data Networks," Cambridge Telcom Report, May 12, 1999.
Joint Claim Construction and Prehearing Statement, Local Patent Rule 4-3, Apr. 21, 2006, in *Caritas Technologies, Inc. v. Comcast Corporation*, U.S. District Court for the Eastern District of Texas Marshall Division, 2:05-CV-339-DF.
Joint Claim Construction Charts, Jul. 17, 2006, in *Caritas Technologies, Inc. v. Comcast Corporation*, U.S. District Court for the Eastern District of Texas Marshall Division, 2:05-CV-339-DF.
Joint Submission in Response to Order Setting a Hearing on the Parties' Joint Motion for Entry of Judgment Pursuant to Rule 54(b), for Certification of Appeal, and to Stay Further Proceedings Pending Appeal, Nov. 6, 2006, in Caritas Technologies, Inc. v. Comcast Corporation, U.S. District Court for the Eastern District of Texas Marshall Division, 2:05-Cv-339-Df.
Lucent Technologies, "Multi Media Communications eXchange System Administrator's Guide and Technical Reference Manual," Release 2.0M 555-027-813, Issue 1, Jul. 1997, 2 pages.
Markman Hearing, Jul. 31, 2006, in *Caritas Technologies, Inc. v. Comcast Corporation*, U.S. District Court for the Eastern District of Texas Marshall Division, 2:05-CV-339-DF.
"AT&T TeleConference Service: Host-Dialed," AT&T, 1997.
"AT&T TeleConference Service: PHone on the Range, AT&T Executive TeleConference Service Hosts Live Cattle Auction," AT&T, 1997.
"AT&T TeleConference Service: Testimonials," AT&T, 1997.
"AT&T TeleConference Service: Tips and Techniques," AT&T, 1997.
"AT&T TeleConference Service: Overview," AT&T, 1997.
"AT&T TeleConference Services: Making it Easy to 'Meet With a Call,'" AT&T, 1997.
"AT&T to Integrate Web and Long-Distance Network to Let Surfers Click to Talk to a Service Agent," Aug. 1996.
"AT&T to Integrate Web and Long-Distance Network to Let Surfers Click to Talk to a Service Agent," Business Wire, Aug. 1996.
"AT&T Video Center Reservations Instructions," AT&T, 1997.
"AT&T Video Room Profile," AT&T, 1997.
"AT&T Vision 2000: The Multimedia Age—Business Communication in the 21st Century," AT&T, Oct. 1995.
"AT&T WorldWorx Compatible Partner Products Apple Quick Time Conferencing," AT&T, 1997.
"AT&T WorldWorx Compatible Partner Products Intel ProShare Personal Conferencing Video System 200," AT&T, 1997.
"AT&T WorldWorx Global Business Video Services—A Powerful Tool for Business." (undated).
"AT&T WorldWorx Network Services Global Business Video Services CLI and AT&T," AT&T, 1997.
"AT&T WorldWorx Network Services Global Business Video Services PictureTel and AT&T," AT&T, 1997.
"AT&T WorldWorx Network Services Global Business Video Services VTEL and AT&T," AT&T, 1997.
"AT&T WorldWorx Personal Conferencing Service Offers You a Smarter, Faster; and More Cost-Effective Way to Get the Job Done," AT&T, 1997.
"AT&T WorldWorx Personal Conferencing Services Agreement," AT&T, 1997.
"AT&T WorldWorx Services Global Business Video Services Overview," AT&T, 1997.
"AT&T WorldWorx Services Personal Conferencing Service Customer Profile Form," AT&T, 1997.
"AT&T: A User's Guide to the Rapport Desktop Conferencing System," AT&T, Mar. 12, 1992.
"AT&T: Managing Multipoint VideoConferences," AT&T, 1997.
"AT&T: Preparing to VideoConference," AT&T, 1997.
"AT&T: Simplified Gateway and Conversion Services," 1997.
"AT&T: The Basics of VideoConferencing," AT&T, 1997.
"AT&T: Tips for Successful VideoConferencing," AT&T, 1997.
"AT&T's Transformation Strategy" (produced in response to subpoena in *Caritas v. Comcast*), available as early as May 8, 2007, pp. 1-11.
Baldwin, T.F., and D.S. McVoy, "Cable Communication," 2d ed., Chapter on the Technological Future, Prentice-Hall, Englewood Cliffs., N.J., 1988.
Baldwin, T.F., and D.S. McVoy, "Cable Communication," 2d ed., Table of Contents, Prentice-Hall, Englewood Cliffs., N.J., 1988.
Barberis, G., et al., "Coded Speech in Packet-Switched Networks: Models and Experiments," IEEE Journal on Selected Areas of Communication, Dec., 1983, pp. 1028-1038.
Bell System Journal, "Common Channel Interoffice Signaling: No. 4ESS Application," Feb. 1978.
Bell System Journal, Various Articles: 4ESS, Jul. 1981.
Bell System Journal; Various Articles: 4ESS, Jul. 1977.
Bisdikian, C., et al., "MultiMedia Digital Conferencing: A Web-Enabled Multimedia Teleconferencing System," IBM Journal of Research and Development 42(2):281-298, Mar. 1988.
Blankenhorn, D., "AT&T and Micom Announce ISDN Card for Personal Computers," May 1990.
Blankenhorn, D., "Micom Releases Voice Piggyback System," Oct. 1993.
Boyer, et al., "Talk Is Cheap," Netware Connections, Sep. 1995.
Burg, F.M., et al., "An Architecture and Protocols for Initiation and Control of Telephone Calls From Terminals Connected to a Call Broker Over a TCP/IP Connection," Internet Draft, Internet Engineering Task Force (IETF), Dec. 1997, pp. 1-13.
"Busy Signals," Business Issues in Technology Computer Letter, Mar. 1995.
Fijoleck, J.J., et al. (eds.), "Cable Modems: Current Technologies and Applications," IEEE and the International Engineering Consortium, 1999, 416 pages.
Cameron, "New for Networks: NetRunner Ethernet Bridge," Sep. 1992.
"Cisco Delivers SS7 Solution for Advanced IP Network Access; With Signaling Controller 2200, Cisco Continues to Deliver on Commitment of Offering Scalable, Carrier-Class Solutions," Press Release, Cisco Systems, Inc., San Jose, Calif., Jun. 1998, 2 pages.
"Competitive Products for the Pandora Technologies EZSpeak System," available as early as May 8, 2007, 3 pages.
Computer Telephony Magazine, Various Excerpts, 1996.
Conroy, L., et al., "Analysis of Services and Interfaces Used When Networking Between the Internet and the Intelligent Network (I.N.)," Internet Draft, Internet Engineering Task Force (IETF), Jun. 1997, pp. 1-19.
"Corvette Dealer Races to Saving on Multi-Use Network," Communications News, Feb. 1992.
"Corvette Dealer Races to Savings on Multi-Use Network (Visone Motors of Saugus, MA) (Modems & Muxes)," Communication News, vol. 29, No. 2, Feb. 1992, 2 pages.
Cronin, P., "An Introduction to TSAPI and Network Telephony," IEEE Communications Magazine 34(4):48-54, Apr. 1996.
Csenger, M., "Micom Adds WAN Routing to Substrate Muxes," Network World 12(3):6, Jan. 1995.
Ahuja, S.R., and J.R. Ensor, "Call and Connection Management: Making Desktop Conferencing Systems a Real Service," ACM SIGCOMM Computer Communication Review 22(3):10-13, Jul. 1992.
Ahuja, S.R., and J.R. Ensor, "Call and Connection Management: Making Desktop Conferencing Systems a Real Service," ACM Computer Communication Review (22):10 11, Mar. 1992.

(56) References Cited

OTHER PUBLICATIONS

Ahuja, S.R., et al., "Supporting Multi-Phase Groupware Over Long Distance," IEEE Global Telecommunications Conference and Exhibition: Communications Technology for the 1990s and Beyond (GLOBECOM '89), Nov. 27-30, 1989, Dallas, vol. 2, pp. 1227-1231.
Ensor, J.R., et al., "The Rapport Multimedia Conferencing System: A Software Overview," Proceedings of the 2nd IEEE Conference on Computer Workstations, Santa Clara, Calif., Mar. 7-10, 1988, pp. 52-58.
"Alliance Dedicated Teleconferencing Service 1," Press Release, AT&T, Nov. 15, 1984.
"Alliance Dedicated Teleconferencing Service 1," Press Release, AT&T, Jan. 3, 1985.
"Alliance Dedicated Teleconferencing Service 2," Press Release, AT&T, Oct. 15, 1984.
"Alliance Dedicated Teleconferencing Service 2," Press Release, Jan. 3, 1985.
"Alliance Dedicated Teleconferencing Service 3," Press Release, AT&T, Oct. 15, 1984.
Alliance TeleServices System Documentation (Vienna Systems), Norlite Technology, Inc., May 1992.
Arango, M., and C. Huitema, "Simple Gateway Control Protocol (SGCP)," Internet Engineering Task Force, May 1998.
Arango, M., and C. Huitema., "Simple Gateway Control Protocol (SGCP)," Version 1.1, Internet Engineering Task Force, Jul. 1998.
Arango, M., et al., "Media Gateway Control Protocol (MGCP)," Network Working Group, Version 1.0, Oct. 1999.
Arthurs, E., and B. Stuck, "Traffic Analysis Tools for Integrated Digital Time-Division Link Level Multiplexing of Synchronous and Asynchronous Message Streams," IEEE Journal on Selected Areas in Communications 1(6):1112-1123, Dec. 1983.
"AT&T Affinity VideoNet, Inc. Public Room Partners Video Conferencing Rates," AT&T, 1997.
"AT&T Definity™ System Network Manager's Guide, PassageWay™ Solution," Release 1.0, AT&T, 1994, 77 pages.
"AT&T Delivers First Product for New Multimedia Networks," AT&T, Oct. 10, 1995.
"AT&T Example Application: Concept Trial Collaborative Meetings," AT&T, Jun. 30, 1993.
"AT&T Global Business Video Services: A Member of AT&T WorldWorx Network Services Family Market Research Videoconferencing FocusVision Network, Inc.," AT&T, 1997.
"AT&T Global Business Video Services: A Member of AT&T WorldWorx Network Services Family Multinational Project Engineering: ITT Automotive," AT&T, 1997.
"AT&T Global Business Video Services: A Member of the AT&T WorldWorx Network Services Family Pharmaceutical and Consumer Products Industry: Warner-Lambert Company," AT&T, 1997.
"AT&T Global Business Video Services: Entries in the AT&T WorldWorx Services Library," AT&T, 1997.
"AT&T Global Business Video Services; A Member of AT&T WorldWorx Network Services Family Corporate Video Conferencing: Metropolitan Life," AT&T, 1997.
"AT&T Inverse Multiplexing," AT&T, 1997.
"AT&T Multimedia Communications eXchange Server Backgrounder," AT&T, 1996.
"AT&T MultiMedia Communications eXchange: Dynamic Video, Voice, and Data from Workstation With the Ease-of-Use and Spontaneity of a Phone Call," 1996.
"AT&T Multimedia Communications eXchange; Customer & Partner Comments / Analyst References / AT&T GBCS Executive Biographies Profiles," AT&T, 1996.
"AT&T MultiMedia Communications eXchange; Dynamic Video, Voice, and Data from Workstation with the Ease-of-Use and Spontaneity of a Phone Call," AT&T, 1996.
"AT&T Multimedia Communications Network Figure Drawings," AT&T, Apr. 23, 1993.
"AT&T Multipoint Control Unit Compatibility Standards Compliant CoDecs," AT&T, 1997.
"AT&T Sales Resource List for VideoConferencing Services, and Sales Resource List for Videoconferencing Services," AT&T, 1997.
"AT&T TeleConference Service and the Focolare Movement," AT&T, 1997.
"AT&T TeleConference Service at American Airlines," 1997.
"AT&T TeleConference Service at Caliber Technology," 1997.
"AT&T TeleConference Service at CourtCall," 1997.
"AT&T TeleConference Service at Entergy Corporation," 1997.
"AT&T TeleConference Service at Installers Service Warehouse," 1997.
"AT&T TeleConference Service at National Car Rental," 1997.
"AT&T TeleConference Service at National Committee to Prevent Child Abuse," 1997.
"AT&T TeleConference Service at Transport Corporation," 1997.
"AT&T TeleConference Service On-Line Trial Information," Oct. 1996.
"AT&T TeleConference Service: Dial-In/Operator Dialed," 1997.
"AT&T TeleConference Service: Executive Offerings Impact on Your Business Decision," AT&T, 1997.
"AT&T TeleConference Service: Executive Offerings Overview," AT&T, 1997.
"AT&T TeleConference Service: Executive Offerings, Call Access Options, and Key Capabilities," AT&T, 1997.
"AT&T TeleConference Service: Executive Offerings," 1997.
"AT&T TeleConference Service: Executive Offerings; When Your Image Is on the Line," AT&T, 1997.
"AT&T TeleConference Service: General Offerings Pricing Information," AT&T, 1997.
"AT&T TeleConference Service: General Offerings," 1997.
Sheldon, T., "Encyclopedia of Networking & Telecommunications," McGraw Hill, 2001.
Simeonov, P.L., et al., "@INGate: A Distributed Intelligent Network Approach to Bridge Switching and Packet Networks," Sixth International Conference on Computer Communications and Networks (ICCCNN'97), Las Vegas, Sep. 22-25, 1997, pp. 358-363.
Sinnreich, H., and J. Young, "Standards Framework for Internet Telephony," Draft Proposal for the 39th Internet Engineering Task Force (IETF) PINT Working Group, Munich, Germany, Aug. 12-15, 1997.
Slater, J.N., "Cable Television Technology," Chap. 9, Ellis Horwood Ltd., Chichester, U.K., 1988.
"Software Product Description; DEC Computer Integrated Telephony for MS Windows," Version 1.OA, DEC doc # SPD 43.54.01, Apr. 1993.
"Software Product Description; DEC Computer Integrated Telephony Server 100/500," Version 1.OA, DEC doc # SPD 36.33.02, Apr. 1993.
Sriram, K., et al., "Discrete-Time Analysis of Integrated Voice/Data Multiplexers With and Without Speech Activity Detectors," IEEE Journal on Selected Areas of Communication 1(6):1124-1132, Dec. 1983.
Strathmeyer, C.R., "An Introduction to Computer Telephony," IEEE Communications, May 1996, pp. 101-111.
"Summa Four Demonstrates Next Major Telecommunications Trend: Open, Programmable Switching for Intelligent Services and Transport," <http://web.archive.org/web/19970618052019/www.summa4.com/jan2495.htm>, Jan. 1995, 2 pages.
"Summa Four Integrates SS7 Into Its VCO Open Programmable Switches," <http://web.archive.org/web/19970618051726/www.summa4.com/oct395c.htm>, Oct. 1995, 2 pages.
"Summa Four: Building Intelligent Wireless Networks," <http://web.archive.org/web/19970618052906/www.summa4.com/prodwwpaper.htm>, Jan. 1995, 4 pages.
"Sun Gains Key Industry Support for Telecommunications Software Platform: SunXTL to be Supported by Linkon, Key PBX Makers," Business Wire, Mar. 1995.
"Sun XTL 1.1 Administrator's Guide, Sun Microsystems XTL Computer-Telephony System," Sun Microsystems Computer Company, Mountainview, Calif., Dec. 1995.
"Sun XTL 1.1 Application Programmer's Guide, Sun Microsystems XTL Computer-Telephony System," Sun Microsystems Computer Company, Mountainview, Calif., Dec. 1995.

(56) References Cited

OTHER PUBLICATIONS

"Sun XTL 1.1 Architecture Guide, Sun Microsystems XTL Computer-Telephony System," Sun Microsystems Computer Company, Mountainview, Calif., Dec. 1995.

"SunXTL 1.1 Remote Client Manager Guide, Revision A," Sun Microsystems Computer Company, Mountainview, Calif., Dec. 1995, 42 pages.

Tak, S.-W., et al., "Design and Implementation of Internetworking System Between ATM and PSTN," Proceedings of International Conference on Information, Communications and Signal Processing (ICICS), Singapore, Sep. 9-12, 1997, pp. 776-780.

"TAPI Remote Service Provider, Version 2.1 of the Microsoft TAPI Software Development Kit," Jun. 1997.

"Telephony Services 2.1," Computer Telephony, Aug. 1995, pp. 34, 39-41.

"Telesis One," Cover, Binary News Reaper (BNR), 1987.

"Telesis One," Table of Contents, Binary News Reaper (BNR), 1987.

"Tutorial on Signaling System 7 (SS7)," Performance Technologies, Inc., Jan. 2000, 23 pages.

Ullrich, "MMCX Server Announced, Rewrites History," 1995.

"V/IP (Voice Over IP) Phone/Fax IP Gateway User's Manual," MICOM Communications Corp., available as early as May 8, 2007, 93 pages.

Vaha-Sipila, A., "URLs for Telephone Calls," Network Working Group, Request for Comments: 2806, The Internet Society, Apr. 2000, pp. 1-21.

"Visual Telephone Systems and Equipment for Local Area Networks Which Provide a Non-Guaranteed Quality of Service," Draft ITU-T Recommendation H.323, International Telecommunication Union, May 1996.

"VocalTec Announces Support of H.323 Standard: Demonstrates Internet Phone Interoperability With Microsoft, Intel," PR Newswire, Oct. 31, 1996, 3 pages.

"VocalTec Introduces the Internet Phone Telephony Gateway Linking Traditional and Internet Telephone Networks," PR Newswire, Mar. 8, 1996, 3 pages.

"VocalTec Telephony Gateway Calling Options," VocalTec Communications, Ltd., 1997.

"VocalTec Telephony Gateway Features," VocalTec Communications, Ltd., 1996.

"VocalTec Telephony Gateway Frequently Asked Questions," VocalTec Communications, Ltd., 1996.

"VocalTec Telephony Gateway Next Generation Telephony," VocalTec Communications, Ltd., 1996.

"VocalTec Telephony Gateway Ordering," VocalTec Communications, Ltd., 1996.

"VocalTec Telephony Gateway Product Component Description and Functional Specifications," VocalTec Communications, Ltd., 1993.

"VocalTec Telephony Gateway Resources for Additional Information," VocalTec Communications, Ltd., 1996.

"VocalTec Telephony Gateway System Requirements," VocalTec Communications, Ltd., 1996.

"VocalTec Telephony Gateway Telephony Gateway Key Components," VocalTec Communications, Ltd., 1996.

"VocalTec Unveils Strategy to Bridge Old World of Telephony and New World of Internet Telephony," Press Release, VocalTec Communications, Ltd., Mar. 1996.

"VocalTec, Ltd. Internet Phone Release 4," VocalTec Communications, Ltd., 1997.

"VocalTec's Internet Telephony Gateway," VocalTec Communications, Ltd., 1996.

"VocalTec's Telephony Gateway: The Ultimate Internet Telephony Solution?" Computer Telephony, Sep. 1996, pp. 30-35.

"Voice-Over IP Taps Intranet for Telephone Service," Cisco World, 1996.

Walters, R., "Computer Telephony Integration," Artech House Publishers, Norwood, Mass., 1993, 462 pages.

"Wang Breaks New Ground in Voice/Data Integration 2," Press Release, Wang Laboratories, Sep. 1986.

"Wang Breaks New Ground in Voice/Data Integration 3," Press Release, Wang Laboratories, Sep. 1986.

"Wang Breaks New Ground in Voice/Data Integration," Press Release, Wang Laboratories, Sep. 1986.

Weinstein, C., and J. Forgie, "Experience With Speech Communication in Packet Networks," IEEE Journal on Selected Areas in Communication 1(6):963-980, Dec. 1983.

Wellner, P.D., et al., "WebRooms: Controlling Conference Calls With the Web," Oct. 1996.

MCNS Holdings, L.P., "Data Over Cable Technical Reports Operations Support System Framework for Data Over Cable Services TR-DOCS-OSSIW08-61016," Draft, Oct. 1996, 20 pages.

Motion for Entry of Judgment Pursuant to Rule 54(b), for Certification of Appeal, and to Stay Further Proceedings Pending Appeal, Oct. 23, 2006, in *Caritas Technologies, Inc. v. Comcast Corporation*, U.S. District Court for the Eastern District of Texas Marshall Division, 2:05-CV-339-DF.

Musser, J., et al., "A Local Area Network as a Telephone Local Subscriber Loop," IEEE Journal on Selected Areas in Communications 1:(6)1046-1054, Dec. 1983.

Net2Phone Communications Without Borders, "PC to Phone," <http://www.net2phone.com/about/press/pressmaterials/pc2p.asp> [retrieved Oct. 10, 2011], 1 page.

Net2Phone Communications Without Borders, "Phone to Phone," <http://www.net2phone.com/about/press/pressmaterials/p2p.asp> [retrieved Oct. 10, 2011], 1 page.

"Nortel Marathon Release 5.0 Startup Guide for Marathon 2K, Marathon 2K Plus and Marathon 3K," Nortel Networks Corporation, Apr. 1996.

"Northern Telecom Announces Availability of ISDN Applications Protocol Software," Press Release, Nortel Networks Corporation, Mar. 1989.

"Novell NetWare Telephony Services 2.21 / LAN Times: Starting Small, Thinking Big," 1996.

"Novell PassageWay™ Telephony Services Solution:NetWare Telephony Services—Definity System Programmer's Guide Release 1.0," Mar. 1994.

Opening Expert Report of Dr. Patrick E. White, Sep. 28, 2006, in *Caritas Technologies, Inc. v. Comcast Corporation*, U.S. District Court for the Eastern District of Texas Marshall Division, 2:05-CV-339-DF.

Opening Expert Report of Dr. Pierce D. Wellner, Sep. 28, 2006, in *Caritas Technologies, Inc. v. Comcast Corporation*, U.S. District Court for the Eastern District of Texas Marshall Division, 2:05-CV-339-DF.

Opening Expert Report of Larry L. Campbell, Sep. 28, 2006, in *Caritas Technologies, Inc. v. Comcast Corporation*, U.S. District Court for the Eastern District of Texas Marshall Division, 2:05-CV-339-DF.

Order Granting Motion for Entry of Judgment Under Rule 54(b) and Administratively Closing Case, Aug. 9, 2006, in *Caritas Technologies, Inc. v. Comcast Corporation*, U.S. District Court for the Eastern District of Texas Marshall Division, 2:05-CV-339-DF.

Order regarding Joint Motion for Entry of Judgment Under Rule 54(b) signed by Judge Folsom, Aug. 9, 2006, in *Caritas Technologies, Inc. v. Comcast Corporation*, U.S. District Court for the Eastern District of Texas Marshall Division, 2:05-CV-339-DF.

"PacketCable™ Gatekeeper Technology Request for Information," Dec. 30, 1997.

Plaintiff Caritas Opening Claim Construction Brief, Jun. 9, 2006, in *Caritas Technologies, Inc. v. Comcast Corporation*, U.S. District Court for the Eastern District of Texas Marshall Division, 2:05-CV-339-DF.

Plaintiff Caritas Technologies, Inc. Answers and Objections to Defendant, Comcast Corporation's First Set of Interrogatories, Jan. 26, 2007, in *Caritas Technologies, Inc. v. Comcast Corporation*, U.S. District Court for the Eastern District of Texas Marshal Division, 2:05-CV-339-DF.

Plaintiff Caritas Technologies, Inc. Preliminary Claim Construction and Extrinsic Evidence, Patent Local Rule 4-2, Apr. 6, 2006, in *Caritas Technologies,. Inc. v. Comcast Corporation*, U.S. District Court for the Eastern District of Texas Marshall Division, 2:05-CV-339-DF.

(56) References Cited

OTHER PUBLICATIONS

Plaintiff Caritas Technologies, Inc. Supplemental Answers and Objections to Defendant, Comcast Corporation's First Set of Interrogatories, Nos. 1-7, Mar. 27, 2006, in *Caritas Technologies, Inc. v. Comcast Corporation*, U.S. District Court for the Eastern District of Texas Marshall Division, 2:05-CV-339-DF.
(Proposed) Final Judgment of Non-Infringement, Oct. 23, 2006, in *Caritas Technologies, Inc. v. Comcast Corporation*, U.S. District Court for the Eastern District of Texas Marshall Division, 2:05-CV-339-DF.
Rebuttal Expert Report of Charles E. Van Horn, Oct. 16, 2006, in *Caritas Technologies, Inc. v. Comcast Corporation*, U.S. District Court for the Eastern District of Texas Marshall Division, 2:05-CV-339-DF.
Reply Brief of Plaintiff-Appellant Caritas Technologies, Inc., Mar. 22, 2007, in *Caritas Technologies, Inc. v. Comcast Corporation*, U.S. Court of Appeals for The Federal Circuit.
Report of Dr. Leonard J. Forys, Oct. 16, 2006, in *Caritas Technologies, Inc. v. Comcast Corporation*, U.S. District Court for the Eastern District of Texas Marshall Division, 2:05-CV-339-DF.
Semilof, M., "LAN Call Center to Aid Sales," Communications Week 576:21-22, Sep. 1995.
Simpson, W., "RFC 1661—The Point-to-Point Protocol," Network Working Group Standards Track Memo, 47 pages, Jul. 1994.
"Sun XTL 1.1 Provider Programmer's Guide: Sun Microsystems XTL Computer-Telephony System," Dec. 1995.
Tutorial on Signaling System 7 (SS7), © 2000-2003, Performance Technologies, Inc., 23 pages.
Ueda, H., et al., "Evaluation of an Experimental Packetized Speech and Data Transmission System," IEEE Journal on Selected Areas in Communications 1(6):1039-1045, Dec. 1983.
Videotaped Deposition of Clark E. Johnson, vols. 1 & 2, Mar. 24, 2006, in *Caritas Technologies, Inc. v. Comcast Corporation*, U.S. District Court for the Eastern District of Texas Marshall Division, 2:05-CV-339-DF.
Videotaped Deposition of Daniel Robbins, Apr. 5, 2006, in *Caritas Technologies, Inc. v. Comcast Corporation*, U.S. District Court for the Eastern District of Texas Marshall Division, 2:05-CV-339-DF.
Videotaped Deposition of David Jack Farber, Aug. 30, 2006, in *Caritas Technologies, Inc. v. Comcast Corporation*, U.S. District Court for the Eastern District of Texas Marshall Division, 2:05-CV-339-DF.
Videotaped Deposition of Derek E. Miller, Sep. 15, 2006, in *Caritas Technologies, Inc. v. Comcast Corporation*, U.S. District Court for the Eastern District of Texas Marshall Division, 2:05-CV-339-DF.
Videotaped Deposition of Gary Mason, Aug. 15, 2006, in *Caritas Technologies, Inc. v. Comcast Corporation*, U.S. District Court for the Eastern District of Texas Marshall Division, 2:05-CV-339-DF.
Videotaped Deposition of John F. Klos, vols. 1 & 2, Apr. 5, 2006, in *Caritas Technologies, Inc. v. Comcast Corporation*, U.S. District Court for the Eastern District of Texas Marshall Division, 2:05-CV-339-DF.
Videotaped Deposition of Meryl Natchez, Aug. 17, 2006, in *Caritas Technologies, Inc. v. Comcast Corporation*, U.S. District Court for the Eastern District of Texas Marshall Division, 2:05-CV-339-DF.
Videotaped Deposition of Richard J. Solomon, vols. 1 and 2, Sep. 12, 2006, in *Caritas Technologies, Inc. v. Comcast Corporation*, U.S. District Court for the Eastern District of Texas Marshall Division, 2:05-CV-339-DF.
Videotaped Deposition of Tice DeYoung, Sep. 8, 2006, in *Caritas Technologies, Inc. v. Comcast Corporation*, U.S. District Court for the Eastern District of Texas Marshall Division, 2:05-CV-339-DF.
"VocalTech Unveils Real World Internet Telephony," Newsbytes, Aug. 30, 1996, 2 pages.
Wellner, P.D., et al., "Conference Scribe: Turning Conference Calls Into Documents," Proceedings of the 34th Annual IEEE Hawaii International Conference on System Sciences (HICSS), Maui, Hawaii, Jan. 3-6, 2001, pp. 1-9.
Wexler, J., "Industry Gets Serious About 'Net Phone Calls," InfoWorld, Nov. 1996, p. 39.

"Will Voice Over IP Turn the Telephony Mart on Its Ear?" Business Wire, Aug. 1996.
Wingrove, A., "Micom Claims to Eliminate IDD Phone Charges for Asia Users," May 1991.
Wintrob, "Northern, DEC in Call Centre Link," Oct. 1991.
Wong, C.C., "Personal Communications," master's thesis, Massachusetts Institute of Technology, Boston, Jun. 1991, 78 pages.
ZDNet, Booting Up Windows 95, 1996.
"Nortel V/IP Phone/Fax IP Gateway: Applications Guide," Nortel Networks Corporation, 1997.
"Nortel V/IP Phone/Fax IP Gateway: Voice Interface Cards and PC Software," Nortel Networks Corporation, 1997.
"Nortel V/IP Selling Guide Release 1.1," Nortel Networks Corporation, Oct. 1997.
"Nortel V/IP Selling Guide," Nortel Networks Corporation, 1996.
"Novell / AT&T, PassageWay™ Telephony Services Solution: NetWare Telephony Services—Definity™ System Network Manager's Guide," Release 1.0, Mar. 1994.
"Novell / AT&T, PassageWay™ Telephony Services Solution: NetWare Telephony Services—Definity™ System Simulator User's Guide," Release 1.0, Mar. 1994.
"Novell Announces NetWare Telephony Services," Feb. 1996.
"Novell Announces Network Telephony Development Tools for Accessing Information by Telephone," Feb. 1996.
"Novell DeveloperNet: Telephony Services Partners Program Guidelines," Mar. 1996.
"Novell Education: Netware Telephony Services," 1994.
"Novell Limited Use Software License Agreement," Feb. 1993.
"Novell NetWare 4 Installation," Dec. 1994.
"Novell NetWare 4 Installing and Using Novell Online Documentation," Dec. 1994.
"Novell NetWare 4 Introduction to NetWare Directory Services," Dec. 1994.
"Novell NetWare 4 Upgrade," Dec. 1994.
"Novell NetWare Telephony Services Network Manager's Guide," Apr. 1994.
"Novell NetWare Telephony Services TSCall User's Guide," Apr. 1994.
"Novell NetWare Telephony Services," 1994.
"Novell News: Screen Shots," Feb. 1996.
"Novell Product Announcement: NetWare Telephony Services 2.1," Jul. 1995.
"Novell Product Announcement: NetWare Telephony Services 2.21," Feb. 1996.
"Novell Telephony Server Application Programming Interface (TSAPI)," Issue 1.9, 1994.
"Novell Telephony Services Information Directory," May 1996.
"Novell TSCall Reference Card / Network Products Software License," 1990.
Novell, "NetWare 4.1 Release Notes," available as early as May 8, 2007, 24 pages.
"Packet Cable™ Architecture Call Flows Technical Report: On-Net MTA to PSTN Telephone," Cable Television Laboratories (CableLabs®), Aug. 2003, 51 pages.
"Packet Cable™ Architecture Call Flows Technical Report: On-Net MTA to On-Net MTA," Cable Television Laboratories (CableLabs®), Aug. 2003, 72 pages.
"Packet Cable™ Architecture Call Flows Technical Report: PSTN Telephone to On-Net MTA," Cable Television Laboratories (CableLabs®), Aug. 2003, 72 pages.
"PacketCable™ 1.0 Architecture Framework Technical Report: PKT-TR-ARCH-V01-991201," Cable Television Laboratories (CableLabs®), Dec. 1999, 72 pages.
"PacketCable™ Internet Signaling Transport Protocol (ISTP) Specification: PKT-SP-ISTP-I01-991201," Cable Television Laboratories (CableLabs®), Dec. 1999, 87 pages.
"PacketCable™ Network-Based Call Signaling Protocol Specification: PKT-SP-EC-MGCP-I02-991201," Cable Television Laboratories (CableLabs®), Dec. 1999, 148 pages.
"PacketCable™ PSTN Gateway Call Signaling Protocol Specification: PKT-SP-TGCP-I01-991201," Cable Television Laboratories (CableLabs®), Dec. 1999, 142 pages.

(56) References Cited

OTHER PUBLICATIONS

Parameshwar, N., and C. Reece, "Advanced SIP Series: SIP and 3GPP," Award Solutions, Inc., Richardson, Tex., as early as Oct. 30, 2002, pp. 1-9.
Petrack, S., and L. Conroy, "The PINT Service Protocol: Extensions to SIP and SDP for IP Access to Telephone Call Services," Internet-Draft, Internet Engineering Task Force (IETF), Oct. 1999, pp. 1-60.
"Platform SDK: Telephony Application Programming Interfaces," retrieved on or before Jul. 22, 2010, 24 pages.
"PlayPen/WebPen Project Update," 1995.
"Protocol for Computer Supported Telecommunications (CSTA) Phase I," Standard ECMA-180, Jun. 1992.
Rasmus, "Dataquest Perspective: The Switch-Computer Integration Market—A New Silver Bullet or Just Another Niche?" Jul. 1992.
Redman, B.E., "A User Programmable Telephone Switch," Bell Communications Research, Sep. 1988.
"Request for Proposals for a Telecommunications Delivery System Over a Hybrid Fiber/Coax (1-IFC) Architecture," PacketCable™, Jul. 1994.
Rohde, D., "NetWare Cti Applications to be Available Over Centrex," Network World, Mar. 1996, page14.
Rohrbough, "Free Ride for Calls and Faxes With Micom's New Device," Apr. 1991.
Rohrbough, "Micom Intros Analogue/Digital Network Product," Aug. 1991.
Rosen, E., and Y. Rekhter, "Bgp/Mpls VPNs," Network Working Group, Request for Comments: 2547, the Internet Society, May 2000, 24 pp.
Sackett, G.C., "Cisco Router Handbook," McGraw Hill, 2000.
Schmandt, C., and M.A. McKenna, "An Audio and Telephone Server for Multimedia Workstations," Proceedings of the 2nd IEEE Conference on Computer Workstations, Santa Clara, Calif., Mar. 7-10, 1988, pp. 150-159.
Schulzrinne, H., "Signaling for Internet Telephony Services," Proceedings of OPENSIG Fall '96 Workshop, New York, Oct. 14-15, 1996, pp. 1-13.
"SDS Distributed Switch: The Workstation for Intelligent Network Services," http://wb.archive.org/eb/19970618051855/www.summa4.com/april95.htm, Apr. 1995, 4 pages.
"Services for Computer Supported Telecommunications (CSTA) Phase I," Standard ECMA-179, Jun. 1992.
Shacham, N., et al., "Speech Transport in Packet-Radio Networks with Mobile Nodes," IEEE Journal on Selected Areas in Communications SAC-1:1084-1087, Dec. 1983.
Csenger, M., "Micom Boosts Voice Compression, Adds Fax Feature to Muxes," Network World, Nov. 7, 1994.
Csenger, M., "Micom Introduces High-End NetRunner Bridge/Multiplexer," Jul. 1994.
Csenger, M., "Micom Triples Capacity of Data/Voice Mux," Network World, Oct. 31, 1994.
Cuervo, F., et al., "SS7-Internet Interworking—Architectural Framework," Internet Draft, Internet Engineering Task Force (IETF), Jul. 1998, 10 pages.
Dalias, R., et al., "Bay Networks' SS7—Internet Gateway Architecture," Transport Working Group, May 1998, pp. 1-11.
"DEC CallCenterPlus: Taking a Closer Look at the Next Generation Call Center," Digital Equipment Corporation (DEC), 1993.
"DEC CIT Program and Products and Nortel's ISDN/AP Protocol," Press Release, Digital Equipment Corporation (DEC), Mar. 14, 1989.
DEC CIT: "Applications Interface for Microsoft Windows: Full-Featured Telephone Integration for the Desktop," Digital Equipment Corporation (DEC), 1993.
DEC CIT: "Applications Interface for Ultrix Programming Reference," Digital Equipment Corporation (DEC), Oct. 1991, pp. 1-1 to 1-85.
DEC CIT: "Applications Interface for Ultrix Programming Reference," Digital Equipment Corporation (DEC), Oct. 1991, pp. 1-86 to 1-185.
DEC CIT: "Applications Interface for ULTRIX Programming Reference,"(1-186 to E8), Digital Equipment Corporation (Dec), Oct. 1991.
DEC CIT: "Applications Interface for ULTRIX Programming," Digital Equipment Corporation (DEC), Sep. 1991.
DEC CIT: "Applications Interface for VMS Programming Reference," Version 3.0 Manual Set, Digital Equipment Corporation (DEC), Oct. 1991.
DEC CIT: "Applications Interface for VMS Programming," Version 3.0 Manual Set, Digital Equipment Corporation (DEC), Oct. 1991.
DEC CIT: "Server for VMS Installation and Configuration," Digital Equipment Corporation (DEC), Oct. 1991.
DEC Collection of News Articles (SS7), Mar. 1989.
"DEC Computer Integrated Telephony (CIT), Linking Voice Switches to Digital Computers: Standards-Based, Open Platform for Call Center Solutions," Digital Equipment Corporation (DEC), 1991.
"DEC Computer Integrated Telephony Application Interface for ULTRIX," Version 3.0, Digital Equipment Corporation (DEC), Sep. 1991.
"DEC Computer Integrated Telephony Server 100/500," Version 1.0, Digital Equipment Corporation (DEC), Sep. 1991.
DEC Cover Memo, Collection of News Articles, Digital Equipment Corporation (DEC), Mar. 1989.
DEC fax re: CIT Profile, Digital Equipment Corporation (DEC), Jul. 1990.
DEC Press Conference and Demos: DEC's CIT Program and Products and Nortel's ISDN/AP Protocol, Digital Equipment Corporation (DEC)/Nortel, Mar. 14, 1989.
"DEC Typical CIT Configuration," Digital Equipment Corporation (DEC), Mar. 1989 (diagram).
DEC: "CIT Server Installation and Configuration (ULTRIX)," Digital Equipment Corporation (DEC), Oct. 1991.
"Definity® Communications System Generic 3 Installation, Administration, and Maintenance of CallVisor ASAI Over the Definity® LAN Gateway," AT&T, Jan. 1996.
"Definity® Communications System Generic 3v4 Call Visor ASAI Technical Reference Manual," AT&T, Sep. 1995.
"Definity® Enterprise Communications Server Release 5 CallVisor PC ASAI Installation and Reference Manual," Lucent Technologies, Bell Labs Innovations, Oct. 1996.
Denker, E-Mail Regarding "Click to Dial," Jan. 1995.
DeTreville, J., and W.D. Sincoskie, "A Distributed Experimental Communications System," IEEE Journal on Selected Areas in Communications SAC-1(6):1070-1075 , Dec. 1983.
"Dialogic CT Connect," Version 1.0, Dialogic, Jul. 1995.
"Digital and Northern Telecom Announce Communications Capabilities for Enterprise-Wide Integration of Voice and Data," Digital Equipment Corporation (DEC), Press Release, Mar. 1989.
"Digital Announces Enterprise-Wide Integrated Voice/Data Capabilities Under Computer Integrated Telephony Program," Digital Equipment Corporation (DEC), Press Release, Mar. 1989.
"Digital Conferencing and Switching System 240e-ns (DCSS 240e-ns)," DynaLec Corporation, available as early as May 8, 2007, 3 pages.
"Digital's Computer Integrated Telephony Platform: Functionally Integrated Voice/Data Solutions," Digital Equipment Corporation (DEC), 1991.
Doss, M., "SCAI Expands the Public Network," Telephony, Nov. 1990.
Dykeman, J., "Terminal Togetherness," Beyond Computing, Sep. 1995, 4 pages.
Edwards, M., "Micro-to-Mainframe Links Are Forged by Stream of Products," Communication News, Mar. 1985, 2 pages.
Elhakeem, A.K., et al., "Spread-Spectrum Access to Mixed Voice-Data Local Area Networks," IEEE Journal on Selected Areas in Communications SAC-1(6)1054-1069, Dec. 1983.
E-Mail Re: International Discount Telecommunications, Jan. 3, 1996.
"Emerging Technology Review," Salomon Smith Barney, vol. 1, Dec. 2001.
Endrijonas, "Micom Has a Way to Lower Office Communication Needs," Nov. 1990.

(56) References Cited

OTHER PUBLICATIONS

Ensor, J.R., and S.R. Ahuja, "Communication Middleware for Multi-Party Multimedia Applications," Bell Labs Technical Journal: Software 2(1):74-85, Spring 1997.
Ensor, J.R., et al., "Control Issues in Multimedia Conferencing," Proceedings of TRICOMM '91. IEEE Conference on Communications Software: Communications for Distributed Applications and Systems, Chapel Hill, N.C., Apr. 18-19, 1991, pp. 133-143.
Ensor, J.R., et al., "User Interfaces for Multimedia Multiparty Communications," IEEE International Conference on Communications (ICC '93), Geneva, May 23-26, 1993, vol. 2, pp. 1165-1171.
Falk, G., et al., "Integration of Voice and Data in the Wideband Packet Satellite Network," IEEE Journal on Selected Areas in Communications 1(6):1076-1083, Dec. 1983.
Fallgatter, et al., "Dataquest Perspective: Switch-to-Host Interfaces: An Overview of the Technology, Standards, and Applications," Feb. 22, 1991.
"FAQs re: RMI and Object Serialization," Sun Microsystems Computer Company, 1996.
Faynberg, I., et al., "A Proposal for Internet and Public Switched Telephone Networks (PSTN) Internetworking," Internet Draft, Internet Engineering Task Force (IETF), Mar. 1997, pp. 1-10.
Nixon, T., "Windows Telephony (TAR) Support in NT 4.0," Windows Telephony, Microsoft Corporation, Jun. 1996, pp. 1-6.
Nortel Business Card: Jim Monk (Systems Engineer Specialist), Nortel Networks Corporation.
"Nortel Centrex IP: Extending a Tradition of Productivity Positioning Paper," Nortel Networks Corporation, 2000.
"Nortel Data, Voice, Fax, LAN," Nortel Networks Corporation, Jul. 1995.
"Nortel E1 Access Module and Digital Voice Module User's Manual," Nortel Networks Corporation, Mar. 1996.
"Nortel Integral 10Base-T Hub Module: Marathon and NetRunner Integration Products," Nortel Networks Corporation, 1997.
"Nortel Integration Router with EasyRouter Technology User's Manual," Nortel Networks Corporation, Jun. 1995.
"Nortel Magnum Router User's Guide Release 2.0," Nortel Networks Corporation, available as early as May 8, 2007, 171 pages.
"Nortel Marathon 20K Pro Owner's Manual-Release 5.1 and Above," Nortel Networks Corporation, Dec. 1996.
"Nortel Marathon 3K Voice/Fax Facility User's Manual," Nortel Networks Corporation, May 1996.
"Nortel Marathon 5KT Pro Owner's Manual Release 5.1 and Above," Nortel Networks Corporation, 1995.
"Nortel Marathon 5KT Pro Owner's Manual-13 Release 5.1 and Above," Nortel Networks Corporation, Nov. 1996.
"Nortel Marathon Integration Products: Data, Voice, Fax, LAN," Nortel Networks Corporation, 1996.
Nortel Marathon NetRunner 5-Slot Chassis Installation and Cabling Manual, Nortel Networks Corporation, Jan. 1996.
"Nortel Marathon NetRunner Release 5.0 Command Facility Reference Guide," Nortel Networks Corporation, Apr. 1996.
"Nortel Marathon NetRunner Release 5.0 Network Management System Module User's Manual," Nortel Networks Corporation, Mar. 1996.
"Nortel Marathon NetRunner: Installing the Power Supply Into an Integration Unit," Nortel Networks Corporation, Feb. 1996.
"Nortel Marathon NetRunner: Installing the Power Supply Into an Integration Unit," Nortel Networks Corporation, Dec. 1995.
"Nortel Marathon Release 5.0 Startup Guide," Nortel Networks Corporation, Apr. 1996.
"Nortel Marathon STADIA Integration Hub Release 5.0: Integration Multiplexer User's Manual," Nortel Networks Corporation, Apr. 1996.
"Nortel Micom ClearVoice: Toll Quality 8 KBPS Voice," Nortel Networks Corporation, 1996.
"Nortel Micom Communications V/IP Phone/Fax IP Gateway: Analog Voice Interface Card Models Release, Version 1.0B," Nortel Networks Corporation, Dec. 15, 1996.
Nortel Micom CompuCALL/Meridian SCAI Introduction, Nortel Networks Corporation, Jul. 1993.
"Nortel Micom Digital Direct Series T1: Marathon and NetRunner Integration Products," Nortel Networks Corporation 1996.
"Nortel Micom Marathon 5KT Pro Integration Multiplexes," Nortel Networks Corporation, 1996.
"Nortel Micom Mod-Tap Cabling Solutions," Nortel Networks Corporation, Mar. 1995.
"Nortel Micom Mod-Tap Cabling Solutions—Interface for EIA 568A," Nortel Networks Corporation, Mar. 1995.
"Nortel Micom NetRunner 75E Integration Router," Nortel Networks Corporation, 1996.
"Nortel Micom Technical Training Enterprise: V/IP Voice Over IP," Nortel Networks Corporation, available as early as Aug. 25, 1997, 14 pages.
"Nortel Micom Technical Training Manual: Marathon Integration Multiplexer NetRunner Integration Router Network Configuration—Instructors Copy," Nortel Networks Corporation, Feb. 1996.
"Nortel Micom Technical Training: V/IP Phone/Fax IP Gateway," Nortel Networks Corporation.
"Nortel Micom Technical Training: Remote Terminal Server (RTS)—Instructors Copy," Nortel Networks Corporation, Oct. 1995.
"Nortel Micom Technical Training: Voice/Fax Support—Instructors Copy," Nortel Networks Corporation, Feb. 1996.
"Nortel Micom Technical Training: Voice/Fax Support—Instructors Copy," Nortel Networks Corporation, May 1997.
"Nortel Micom® Code Download User's Manual for Communications Control Module, Integration Router Module, T1 Access Module and Voice Software," Nortel Networks Corporation, Dec. 1995.
"Nortel Mod-Tap Cabling Solutions Interface for EIA 568B," Nortel Networks Corporation, Mar. 1995.
"Nortel Mod-Tap Cabling Solutions Interface for USOC," Nortel Networks Corporation, Mar. 1995.
"Nortel Mod-Tap Cabling Solutions Ordering Information," Nortel Networks Corporation, Mar. 1995.
"Nortel Mod-Tap Cabling Solutions Overview," Nortel Networks Corporation, Mar. 1995.
"Nortel Mod-Tap Cabling Solutions Test Equipment," Nortel Networks Corporation, Mar. 1995.
"Nortel NetRunner Release 5.0 WAN User's Manual," Nortel Networks Corporation, Apr. 1996.
"Nortel Networks™ Universal Signaling Point for Seamless Interworking," Product Brief, Nortel Networks Corporation, Jan. 2000, 4 pages.
"Nortel Remote Terminal Server Release 3.1 User's Manual," Nortel Networks Corporation, 1995.
"Nortel Six- and Twelve-Channel Expansion," Nortel Networks Corporation, 1995.
"Nortel System Engineering Bulletin: UK CompuCALL," Nortel Networks Corporation, Mar. 1995.
"Nortel T1 Access Module and Digital Voice Module User's Manual," Nortel Networks Corporation, Dec. 1995.
"Nortel Turbo Universal Voice/Fax Module and Telephone Interface Modules User's Manual," Nortel Networks Corporation, Mar. 1996.
"Nortel V/IP Phone Fax IP Gateway Applications Guide: Complete Voice and Fax Integration Over IP Networks," Nortel Networks Corporation, Jun. 1997.
"Nortel V/IP Phone/Fax IP Gateway Analog Voice Interface Cards for Netware and MS DOS User's Manual (Preliminary)," Nortel Networks Corporation, Aug. 1996.
Layland, R., "AT&T Spins Off a Killer App for ATM," Data Communications WAN Views, 1995, 2 pages.
Leiden, C., and M. Wilensky, "TCP/IP for Dummies," 4th ed., IDG Books Worldwide, Chicago, 2000.
Arthur D. Little Inc., "Developing an Interface Spec Data Over Cable," Dec. 1995.
Arthur D. Little Inc., "Discussion Material Switching Architectures for PCN Project for Cable Labs, Inc.," Dec. 1991.
Arthur D. Little Inc., "Evolving PCN/PCS Switching and Control Architectures and Economics Concepts and Implications," Jan. 1992.
Arthur D. Little Inc., "Ltr to Cable Labs Re: Enterprise Management System Integration Cost and Benefit Analysis," Sep. 1995.

(56) References Cited

OTHER PUBLICATIONS

Arthur D. Little Inc., "Task 2—Analysis of PCN for Cable: Alternative Scenarios for Further Analysis Cable Labs PCN/PCS System Integrator Projects," Feb. 1992.
Lucent Technologies, "MultiMedia Communications eXchange: Local and Wide Area Network Considerations—A MultiMedia Communications Exchange White Paper," 1996, pp. 1-11.
Ma, G., "H.323 Signaling and SS7 ISUP Gateway: Procedure Interworking," Internet Draft, Internet Engineering Task Force (IETF), Oct. 1998, 7 pages.
Macedonia, M.R., and D.P. Brutzman, "MBone Provides Audio and Video Across the Internet," Computer 27(4):30-36, Apr. 1994.
Mahmoud, S., et al., "An Integrated Voice/Data System for VHF/UHF Mobile Radio," IEEE Journal on Selected Areas in Communications 1(6):1098-1111, Dec. 1983.
"Mapping IDL to Java," Sun Microsystems Computer Company, Feb. 20, 1996.
Margulies, E., "Client Server Computer Telephony," Flatiron Publishing, New York, Aug. 1994.
Margulies, E., "Client Server Computer Telephony," 2d ed., Flatiron Publishing, New York, Mar. 1997.
Margulies, E., "Understanding the Voice-Enabled Internet," Table of Contents, Flatiron Publishing, New York, Aug. 1996.
Michalski, J., "Shared Spaces / Virtual / Includes Related Article on TCP/IP / Industry Trend or Event," 1995.
"Micom Achieves MCI Certification for Frame Relay Products," Business Wire, Jan. 1996.
"Micom Adds New Network Feeder Products for Data Voice WAN Integration," Business Wire, Jan. 1996.
"Micom Announces High-Speed Digital Modules for Marathon and NetRunner Integration Products," Business Wire, Jan. 1996.
"Micom Announces New Low-Cost Clear Voice Module for Marathon Product Line," Business Wire, Dec. 1996.
"Micom Certified by EMI for Voice Over Frame Relay," Business Wire, Feb. 1996.
"Micom Code Download User's Manual for Communications Control Module, Integration Router Module, T1 Access Module and Voice Software," Dec. 1995.
"Micom Debuts High-Capacity Data/Voice Integration Headquarters Solution, Business Wire," 1994.
"Micom Earns ISO 9001 Certification," Business Wire, Jan. 1996.
"Micom Increases Network Performance in Leased Line and Public Frame Relay Networks," Business Wire, Apr. 1996.
"Micom Integrates Voice and Fax With LAN and Data Over Public Frame Relay," Business Wire, Aug. 1995.
"Micom Launches Enhanced Sales Channel Program for US Market," Business Wire, Aug. 1996.
Micom Showcases New V/IP Phone/Fax IP Gateway at Internet World, Business Wire, Dec. 1996.
Micom Technical Training, "V/IP—Phone/Fax IP Gateway—V/IP Analog/T1/E1—DOS/NETWARE/WIN95," Aug. 25, 1997, 18 pages.
Micom Technical Training, "VIP NetVoice," available as early as Aug. 25, 1997, 55 pages.
Micom Technical Training, Instructor's Copy, "V/IP—Phone/Fax IP Gateway," available as early as Aug. 25, 1997, 15 pages.
"Micom Unveils New Integration Router Family at ComNet," Business Wire, Jan. 1995.
"Micom V/IP Phone/Fax IP Gateway," 1998.
"Micom Voice Exceeds Toll-Quality," Business Wire, Oct. 1996.
"Micom Website Loaded With Product Info, News and Customer Application Stories," Business Wire, Oct. 1995.
"Micom: First With New G.729 CS-ACELP Voice Compression," Business Wire, Mar. 1996.
"Micom's Marathon Rated Best Value," Business Wire, Oct. 1996.
"Micom's New V/IP Product Family Adds Voice Fax to Enterprise IP Networks," Business Wire, Sep. 1996.
Montgomery, W.A., "Techniques for Packet Voice Synchronization," IEEE Journal on Selected Areas in Communications SAC-1(6):1022-1028, Dec. 1983.

"More About DEC's CallCenterPLUS, Telecommunications Product Review," The Aries Group 19(12):1-4 , Dec. 1992.
Lucent Technologies, "Multimedia Communication eXchange: Communications Middleware White Paper," 1996.
Lucent Technologies, "Multimedia Communication eXchange: Dynamic Voice, Video, and Data from Workstations With the Ease of Use and Spontaneity of a Phone Call," 1996.
Lucent Technologies, "Multimedia Communication eXchange: Integrating the Power of Video, Audio, and Data Collaboration," 1996.
Lucent Technologies, "MultiMedia Communications eXchange: Multimedia Calling White Paper," 1996.
Net2Phone: "IDT's Net2Phone Partners with Daewoo," Press Release, Hackensack N.J., Mar. 1997.
"New Easy-Router Technology From Micom Delivers 'No Tears' Routing," Business Wire, Jan. 1995.
"New Technology Lets PCS Call Telephones," Investor's Business Daily, Oct. 1995.
Newton, "Computer Telephony Goes Interoperable," Computer Telephony, Mar. 1995, pp. 14-20.
Newton, "Has Novell Abdicated Telephony Services?" 1994.
Ninkie, et al., "WebRooms," Mar. 3, 1995.
Faynberg, I., et al., "Converged Networks and Services: Internetworking IP and the PSTN," Wiley Computer Publishing, New York, Jan. 2000.
"First of Many AT&T Products for New Multimedia Networks," Lucent Technologies, Oct. 1995.
Fischell, "Advances in Audiographic Communication Technology 1," Nov. 13, 1987.
Fischell, "Advances in Audiographic Communication Technology 2," Nov. 13, 1987.
Foard, et al., "Switch-to-Computer Networking in the Nineties: The Evolution of AT&T's Switch-Computer Interfaces," Sep. 1991.
Forbes, R., "Requirements for Functional Architecture for IN Support of IP-Networks," ITU Telecommunications, Mar. 1999, pp. 1-19.
Rohde, D., "Frame Relay Gives Bassett Healthy Return," Network World 13(35):1, 69, Aug. 1996.
Generations™ System Operation Guide, Voicetek Corporation, 1995.
Gerhardt, P.M., "MultiMedia Communications eXchange: Local and Wide Area Network Considerations," Proceedings of First Annual Conference on Emerging Technologies and Applications in Communications, Portland, Oregon, May 7-10, 1996, pp. 148-155.
Glitho, R.H., "Isolating Faulty Routing Tables in SS7 Networks: Present and Future," IEEE Communications Magazine 34(5):98-104, May 1996.
Goralski, W.J., and M.C. Kolon, "IP Telephony," McGraw Hill, 2000.
Grant, "Cable Television," Chap. 24, "Integrating Telephone Services," Prentice Hall, Englewood, N.J., Jun. 1983.
Grant, W., "Cable Television," Table of Contents, Prentice Hall, Englewood, N.J., Jun. 1983.
Greene, N., et al., "Media Gateway Control Protocol Architecture and Requirements," RFC 2805, Network Working Group, The Internet Society, Apr. 2000, pp. 1-46.
Greene, T., "Micom Adds Frame Relay to Multiplexer and Router Lines," Network World, Aug. 1995.
Greene, T., "Neura Boosts Bandwidth for Voice Over Frame," Network World, Oct. 1996.
Greene, T., "Talk Is Cheap—At Least Frame Relay Lines," Business Wire, Feb. 5, 1996.
Greene, T., "Voice of IP Is Sounding Better," Network World, Nov. 1996.
Greene, T., "Will Voice Over IP Turn the Telephony Mart on Its Ear?" Network World, Aug. 1996.
Grigonis, "The Origin of LAN Call-Control Apis," Computer Telephony, Apr. 1995, pp. 102-103.
Gruber, J.G., and N.H. Le., "Performance Requirements for Integrated Voice/Data Networks," IEEE Journal on Selected Areas in Communications SAC-1(6):981-1005, Dec. 1983.
Harler, C., "Phillies Network Is Hard-Hitting and Error-Free (Philadelphia Phillies Use Local Area Network for Automated Ticketing System)," Communication News, vol. 30, No. 11, Nov. 1993, 2 pages.

(56) References Cited

OTHER PUBLICATIONS

Haszto, E.D., and N.D. Weber, "Alliance Teleconferencing Services Boost Business Efficiency," AT&T Technology 3(1):22-31, 1988.

Hoberecht, W., "A Layered Network Protocol for Packet Voice and Data Integration," IEEE Journal on Selected Areas in Communications 1(6):1006-1013, 1983.

Höneisen, "Convergence of Internet and Intelligent Networks: Interactions of Services Using PINT," Nokia Research Center, Sep. 1999, pp. 1-106.

Horn, D.N., and A. Sharma, "A Versatile Audio Bridge for Multimedia Conferencing," IEEE International Conference on Communications: Serving Humanity Through Communications (SUPERCOMM/ICC '94), New Orleans, May 1-5, 1994, vol. 3, pp. 1754-1762.

"IBM AS/400 CallPath/400 Programmer's Reference," IBM, 1994.

"IBM CallPath Developers Toolkit, IBM," Aug. 1995.

"IBM CallPath Server General Information," IBM, Aug. 1995.

"IBM CallPath Services Reference for Northern Telcom DMS-100 CO Switch," IBM, Aug. 1995.

"IBM Planning, Installation, and Problem Determination Guide," IBM, Aug. 1995.

"IBM/CTI Overview of IBM's Call Path Computer Telephony Integration" (CTI), IBM.

"IDT Announces Plans to Release Phone-to-Phone Technology Via the Internet," IDT Corporation, Hackensack, N.J., PR Newswire Press Release, Oct. 1996.

"IDT Unveils Revolutionary Telecommunications Technology," IDT Corporation, Hackensack, N.J., PR Newswire Press Release, Jul. 1996.

IEEE Journal on Selected Areas in Communications SAC-1(6), Dec. 1983, 2 pages.

Wexler, J., "Industry Gets Serious About 'Net Phone Calls," InfoWorld, Nov. 25, 1996.

"InSoft Communique! Key Component in AT&T GBCS New Multimedia Communications System," Business Wire, Oct. 30, 1995.

"Instructions for Schedule D (Form 1120S)," Internal Revenue Service, 1995.

"Integrated SS7," <http://web.archive.org/web/19970618052054/www.summa4.com/prodss7.htm>, Sep. 1995, 3 pages.

Jenq, Y.-C., "Performance Analysis of a Packet Switch Based on Single-Buffered Banyan Network," IEEE Journal on Selected Areas in Communications SAC-1(6):1014-1021, Dec. 1983.

Jesitus, J., "Putting Voice and Data on Same Road," Communication News, vol. 27, No. 7, Nov. 1993, 3 pages.

Katz, B., and L.M. Sanders, "MMCX Server Delivers Multimedia Here and Now," AT&T Technology 10(4):2-6, Dec. 1995.

Kemp, et al., "Telesis One Enhanced Multiparty Communications," 1987.

Kim, B.G., "Characterization of Arrival Statistics of Multiplexed Voice Packets," IEEE Journal on Selected Areas in Communications SAC-1(6):1133-1139, Dec. 1983.

Krapf, E., "Cisco Adds Voice to Remote Access Routers," Business Communications Review, Dec. 1, 1997, p. 60.

Krishnaswamy, M., "PSTN-Internet Internetworking—An Architecture Overview," Internet Draft, Internet Engineering Task Force (IETF), Nov. 1997, pp. 1-15.

Krishnaswamy, M., and H. Lu, "Information Exchange to Be Supported by the Support Transfer Protocol (SSTP)," Internet Draft, Internet Engineering Task Force (IETF), Jul. 1997, pp. 1-7.

Kuo, F., "Protocols and Techniques for Data Communication Networks," Prentice-Hall, Englewood Cliffs, N.J., 1981.

Fijoleck, J.J., "Cable Modems: Current Technologies and Applications (Advances in the Information Industry Series)," International Engineering Consortium, Chicago, Jan. 1999.

"LAN Magazine Product of the Year: Micom NetRunner Integration Router," Business Wire, Apr. 1996.

DIAL UP TELEPHONE CONFERENCING SYSTEM CONTROLLED BY AN ONLINE COMPUTER NETWORK

CROSS-REFERENCES TO RELATED APPLICATIONS

This application is a continuation of application Ser. No. 12/410,269, filed Mar. 24, 2009, now U.S. Pat. No. 8,077,844; which was a continuation of application Ser. No. 10/705,571, filed Nov. 10, 2003, now U.S. Pat. No. 7,522,542; which was a continuation of application Ser. No. 10/087,671, filed Mar. 1, 2002, now U.S. Pat. No. 6,661,779; which was a continuation of application Ser. No. 09/819,079, filed Apr. 30, 2001, now U.S. Pat. No. 6,480,474; which was a continuation of application Ser. No. 09/587,080, filed Jun. 3, 2000, now U.S. Pat. No. 6,266,328; which was a continuation-in-part of application Ser. No. 09/212,786, filed Dec. 16, 1998, now U.S. Pat. No. 6,072,780; which was a continuation-in-part of application Ser. No. 08/918,564, filed Aug. 22, 1997, now abandoned, which claimed the benefit of priority pursuant to 35 U.S.C. §119 of Provisional Application No. 60/024,592, filed Aug. 26, 1996, all of which are hereby incorporated by reference herein in their entirety.

BACKGROUND

This invention relates to telephone conferencing, and in particular to dial up telephone conferencing utilizing computer control.

In the art, it is known that telephone conferences may be implemented through "conferencing centers" provided as a service by local and long distance telephone companies. A list of telephone numbers of the conferees and the date and time at which the conference is to begin is supplied to a conference center operator who performs the dialing operations to bring the conferees simultaneously on line to initiate the conference. This technique is limited by the necessity of setting up a relatively inflexible forum in which all participants must be designated in advance, and the inclusion and reliance upon outside telephone company personnel to implement the conference.

A more recent form of conferencing utilizes digital networks such as the Internet that are publicly accessible by individual computers (typically PCs) via Internet host, and may utilize software which allows fully duplexed communication between the PCs. Typically, the conference is conducted with the exchanged information visually appearing on the individual PC display screens. In more sophisticated applications allowing audio communication between the conferees, additional hardware is required at each PC site. A microphone and analog to digital converter provide digitized audio input to a PC by means of appropriate software, such as commercially available VocalTec software, and the audio output is derived from the digital information transmitted over the Internet by use of a digital to analog converter feeding a speaker. Encryption software may be employed to "scramble" the digital information transmitted via the network, but all potential conferees must be provided with this software, and must be alerted to the fact that it is being used. Hence, a conference of multiple conferees requires additional hardware and software at each PC site in order to implement a conference by means of the Internet.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Figure 1:
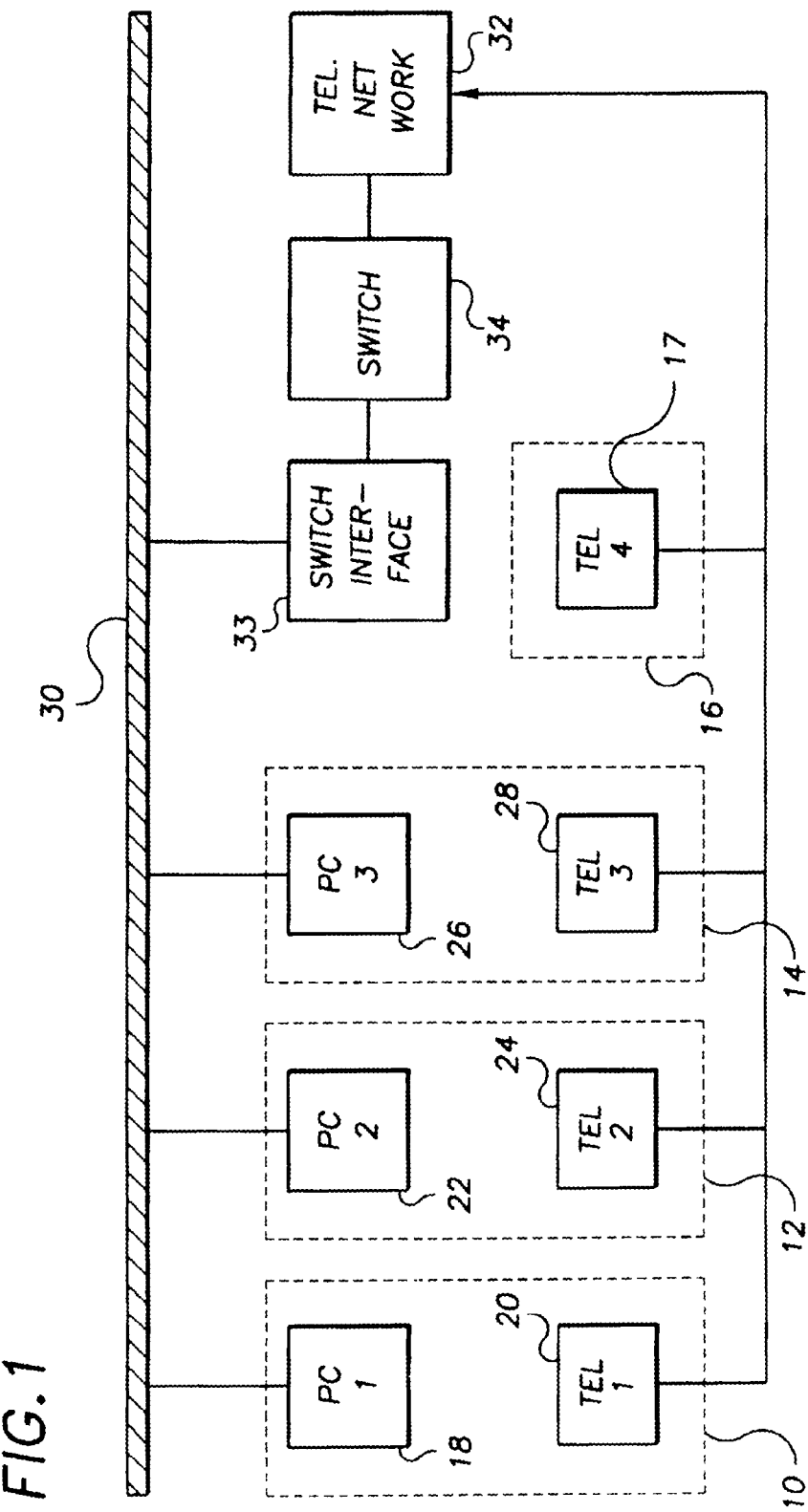
FIG. 1 is a block diagram of the system of the invention.

Referring to FIG. 1, a conferee station 10 consists of a PC computer 18 and a telephone 20. Conferee stations 12, 14, correspondingly have PC computers 22, 26 and telephones 24, 28. Other conferee stations, i.e., 16, may still be connected into the conference network without the requirement of a computer; the conferee station 16 comprising only the telephone 17. All the PCs are connected to the Internet network 30 using standard Transmission Control Protocol/Internet Protocol (TCP/IP) connect software. The telephones 20, 24, 28, 17 are tied into the telephone network 32 in a conventional manner. It will be noted that the telephones 20, 24, 28, 17 are independent of the Internet network 30. A switch interface 33 controlling a telephone switch 34 is also connected so as to receive control signals via the Internet 30 and to transmit them to the telephone network 32, as will be described below.

Any one of the conferee stations 10, 12, 14, possessing a PC, may be designated as Conference Meister. For convenience of explanation, it is assumed that conferee station 14 is designated as Conference Meister. To implement this designation, PC 26 of conferee station 14 is provided with additional software which allows PC 26 to communicate with the switch interface 33 both to control the telephone switch 34 and to receive status information from the telephone switch 34, via the Internet 30.

The Conference Meister station 14 and the switch interface 33 communicate over the TCP/IP transport layer of the Internet 30 using the Internet's User Datagram Protocol (UDP) with checksum. A common fixed-length interprocess message called the Conference Protocol Data Unit (CDPU), using the software format further described below in Table I, is exchanged between the Conference Meister 14 and the switch interface 33, in the data field of a UDP-Datagram. The switch interface 33 converts the CDPU into Signalling System 7 (SS7) commands which act on the switch 34, and attendantly, on the telephone network 32 to control the conferees telephones 20, 24, 28, 17. SS7 is an internationally recognized telephony standard of 255 commands for controlling telephone calls via switch 34 using standard lookup table procedures. The switch interface 33 interacting with the switch 34 may be implemented incorporating a standard micro-computer such as a Motorola 68705P5 performing the table lookup translation of SS7 commands into CPDU commands stored in its ROM memory. It will be noted that the switch interface 33 is bi-directional, and telephone connection status information as established by the switch 34, i.e., ringing, off-hook, on-hook, busy, for all participants is transmitted back via the Internet to the Conference Meister for icon display on his PC.

All fields in the CPDU are ASCII character fields. The CPDU consists of 32 bytes of data as follows:

| Session ID/ | Conference ID/ | Command/Response Code/ | Data/ |
|---|---|---|---|
| 4 bytes | 2 bytes | 2 bytes | 24 bytes |

The Session ID and Conference ID fields contain administrative "housekeeping" information. The Command/Response Code field indicates the message type and the message meaning. Parameters of the Data Field are fixed length subfields and depend upon the message type. Detailed descriptions of the Command/Response Code field are shown below in Table I.

TABLE I

| Code | Command | Response | Meaning |
|---|---|---|---|
| HE | X | | HELLO. Conference Meister's request for Session-Id. |
| LO | | X | LOGON. The Switch Interface's response to a Conference Meister's HE (Hello) assigning him his temporary Session-Id, and signaling him to logon. |
| LO | X | | LOGON. A Conference Meister's logon. Information giving user id, password, and account number in the data field. |
| RS | | X | RESOURCES. The Switch Interface's acceptance of a Conference Meister's LO (Logon). |
| EC | X | | ESTABLISH CONNECTION. A Conference Meister's request that a specified telephone number be connected to a conference. |
| SU | | X | SUCCESS. The Switch Interface's response to an EC (Establish Connection) request. If successfully completed, it returns a connection-id used to refer to this member's conference connection. |
| FA | | X | FAIL. The reply sent when LO (Logon) or EC (Establish Connection) fails. Failure details are carried in the data field. |
| DC | X | | DISCONNECT. A request from the Conference Meister to disconnect a conference member's connection, or to terminate a conference (disconnect all member connections on the conference). |
| DC | | X | DISCONNECT. An unsolicited response from the Switch Interface notifying the Conference Meister that a conference member's connection has been disconnected. |
| ST | X | | STATUS. This command is the Conference Meister's means of maintaining and reconstructing its conference information in the face of dropped connections and unreliable datagram transmissions. |
| ST | | X | STATUS. The Switch Interface's reply to a Conference Meister's status request. |
| ER | | X | ERROR. This is the reply used to signal invalid message parameters, such as Session-Id |
| IH | X | X | I'M HERE. This message confirms that Conference Meister and Switch interface are still in contact during intervals when there is no command/response traffic between them. |

In the above description of the invention, the Conference Meister 14 initiates the conference. By providing CDPU software to the other conferees, the invention allows any other one of the conferee stations, i.e., 10, 12, to serve as a Conference Meister.

Figure 4:
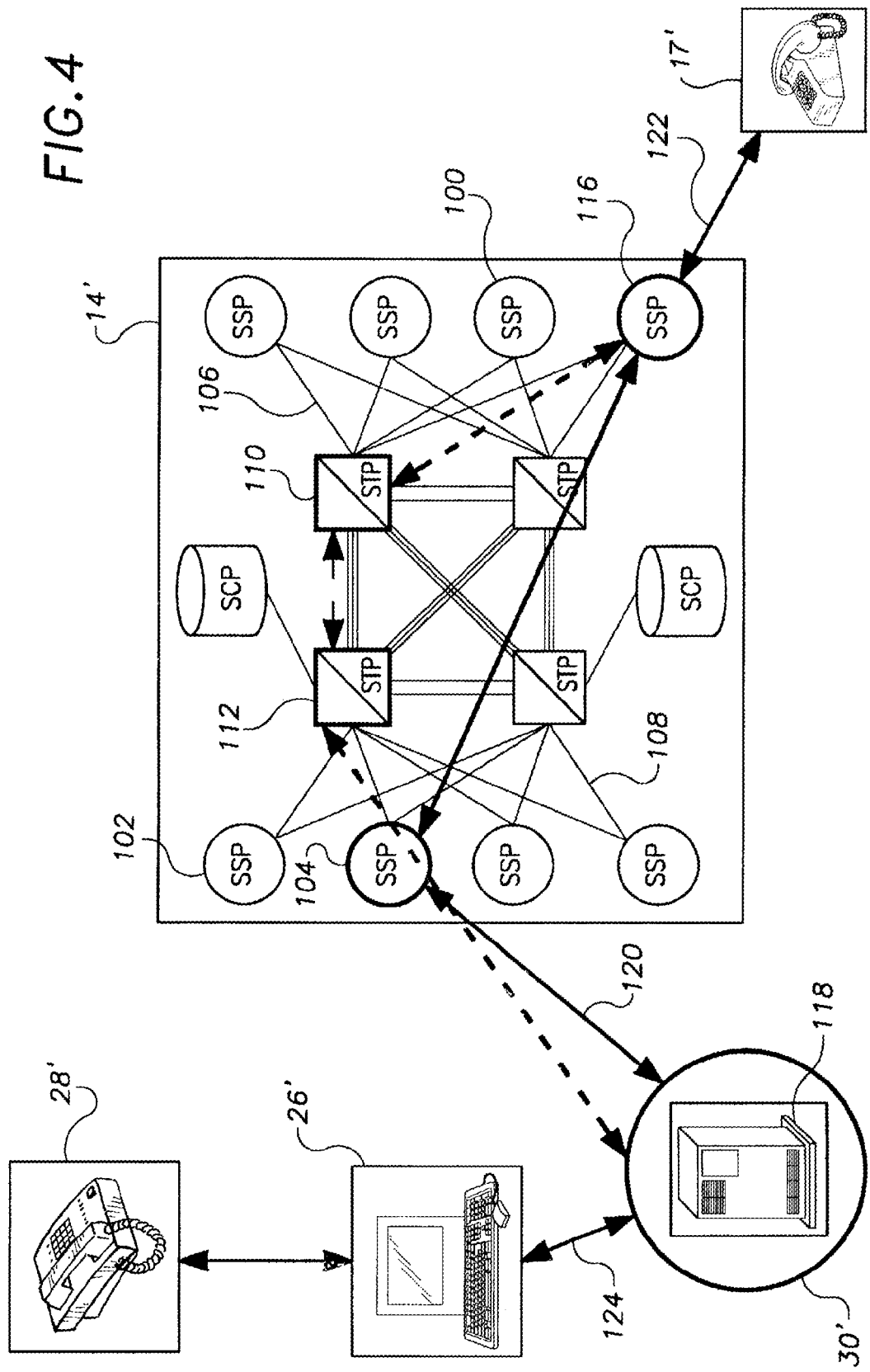
FIG. 4 is a block diagram of the invention showing the information of FIG. 1 in greater detail.

The functional interrelation of the elements of the system illustrated in FIG. 1 may be further understood by reference to FIG. 4. In FIG. 4, the abbreviations, used industry-wide, have the following meanings: SSP=Central Office (i.e., Service Signalling Point), SCP=Service Control Point (it is an alternate SS7 entry point), and STP=Signal Transfer Point. (In the drawings, different but related elements are identified with the same reference characters, albeit that corresponding elements in the various drawings are distinguished by primes.) The components of the telephone system are expanded in the box 14' showing one or more interconnected telephone central offices, e.g., 100, 104 that also contain control elements of the SS7 system, e.g., 110, 112. As one example of the interaction between the telephone system and the control disclosed in the present invention, a call placed by telephone 17' using conventional dialing enters the system through telephone central office 116. The call is internally routed, if necessary, by the SS7 control system over the telephone network to a telephone central office 104 which is connected to a telephone system/Internet interface, 33' and 34', that sends SS7 signals to an Internet computer 118 that a telephone call is in process and destined to the Internet 30'. (The dashed lines of FIG. 4 denote digital control functions; while the heavy black lines denote transmitted audio telephone signals as will be described below.) As is known in the art, within the Internet system are digital computers, e.g., 118, acting as routers, servers and capable of performing other digital manipulations. Hence, via the interface/switch control path 33', 34' the telephone central office advises the Internet computer 118, via the SS7/Internet control interface, that an audio signal is to be passed to the Internet. The telephone central office 104 transmits 120 the voice signals 122 originating at telephone 17', to the Internet computer 118 where it is digitized, if necessary, and packetized for transmission on the Internet. This switching and inter-node connecting of this entire process has taken place between the telephone system 14' and the Internet 30' under control of SS7 signals. Internet computer 118 converts or maps the SS7 command signals to TCP control signals that route and process the packets through the Internet, as disclosed above. The message 124 transits the Internet 30' to its destination, say, PC 28 of FIG. 1 where software decodes the audio message 124, rings the telephone 28, and provides an analog audio signal for telephone 28, corresponding to audio signal 122, generated at telephone instrument 17'.

In a second embodiment of the invention, the system of FIG. 1 may be further configured to provide an inherent call-back capability. Though it uses the same conferencing software described above, call-back can be between just two parties. Essentially each PC station is set up so it can serve as a "conference meister"; no other special software or hardware need be installed on a station's PC. Only the initiating station requires a PC or other access to the Internet. A suitably programmed touchtone phone can be used to access the Internet without the use of a computer such as the PC. The two party call-back feature sets up the call via the Internet with the conversation taking place on the normal telephone system in a manner substantially the same as that described above for conferencing.

Figure 2:
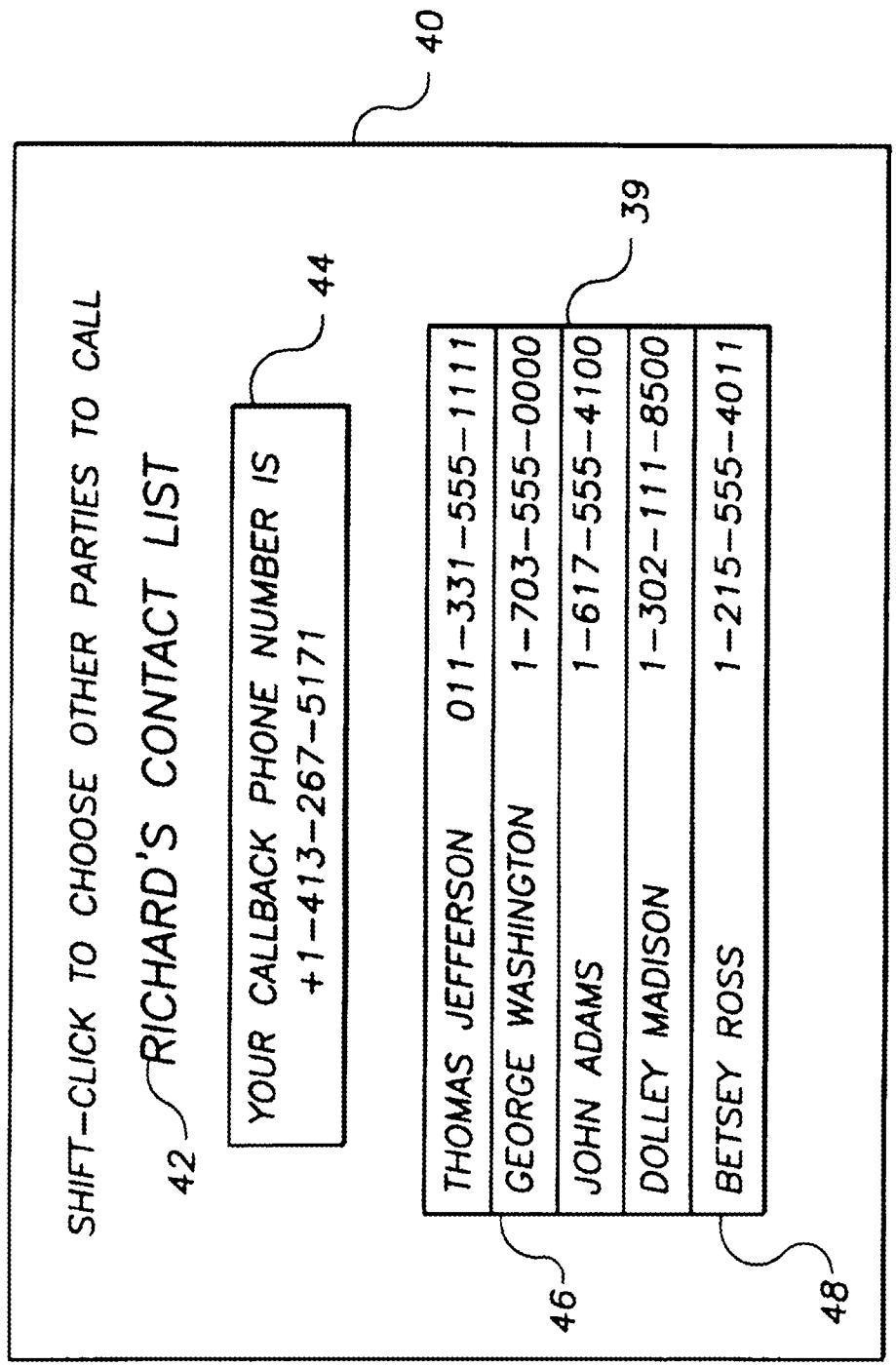
FIG. 2 is a drawing of a computer display according to the invention.

Referring to FIG. 2, a participating PC call-back station shows a display chart 40 on its monitor. The display chart 40 contains the station identification 42 (e.g., Richard) and a contact list 39, and the PC station's call-back telephone number 44. The contacts are shown with their complete dial-up telephone numbers, e.g., 46, 48, and by clicking on one or more of the displayed contacts, calls are dialed to the selected parties via the Internet and the switch 34 of FIG. 1, as previously described for conference calling. It will be appreciated that single parties can be selected to allow two person telephone conversation utilizing the convenience of simplified "point and click" dialing via the stored telephone numbers shown on the PC monitor screen. In the two party call-back connection system described above, it is not necessary to have two telephone lines at a PC station, i.e., one for connection to the Internet and one for carrying the telephonic conversation. With a single telephone line, the system software may be set to instantly disconnect the Internet connection after the called party's number is transmitted by the PC to the switch 34, and to ring the call initiator's telephone simultaneously. In this manner, the calling party and the called party are connected by means of a single telephone line in seconds.

Anonymity of the caller is preserved by the invention even when the calling party has automatic numbering identification (ANI) or "Caller ID". Since the system makes all its connections to the called party via the call-back technique from the remote switch 34 under control of the "conference meister" software, the only records of all the connected telephone numbers are recorded at the switch 34, including the number of the calling party. This occurs because the caller or "conference meister" is also one of the call-back numbers. Each connection is shown as a separate call on the inter-office telephone control (SS7) software originating from the switch 34, not from a calling party's telephone. The switch 34 can have an anonymous telephone number assigned as the originating number. Alternately, the calling party can designate some other listed number for ANI sending or Caller ID purposes which would key the called party as to who is calling.

With the anonymous option, no traceable record of a call is available locally. This minimizes industrial espionage at hotels, customer offices, and even private homes where merely the fact that certain parties made a call could be valuable information. The proper legal authorities can always get the full records from the central switch 34, if need be, to document who initiated the call, and which telephones were called.

Figure 3:
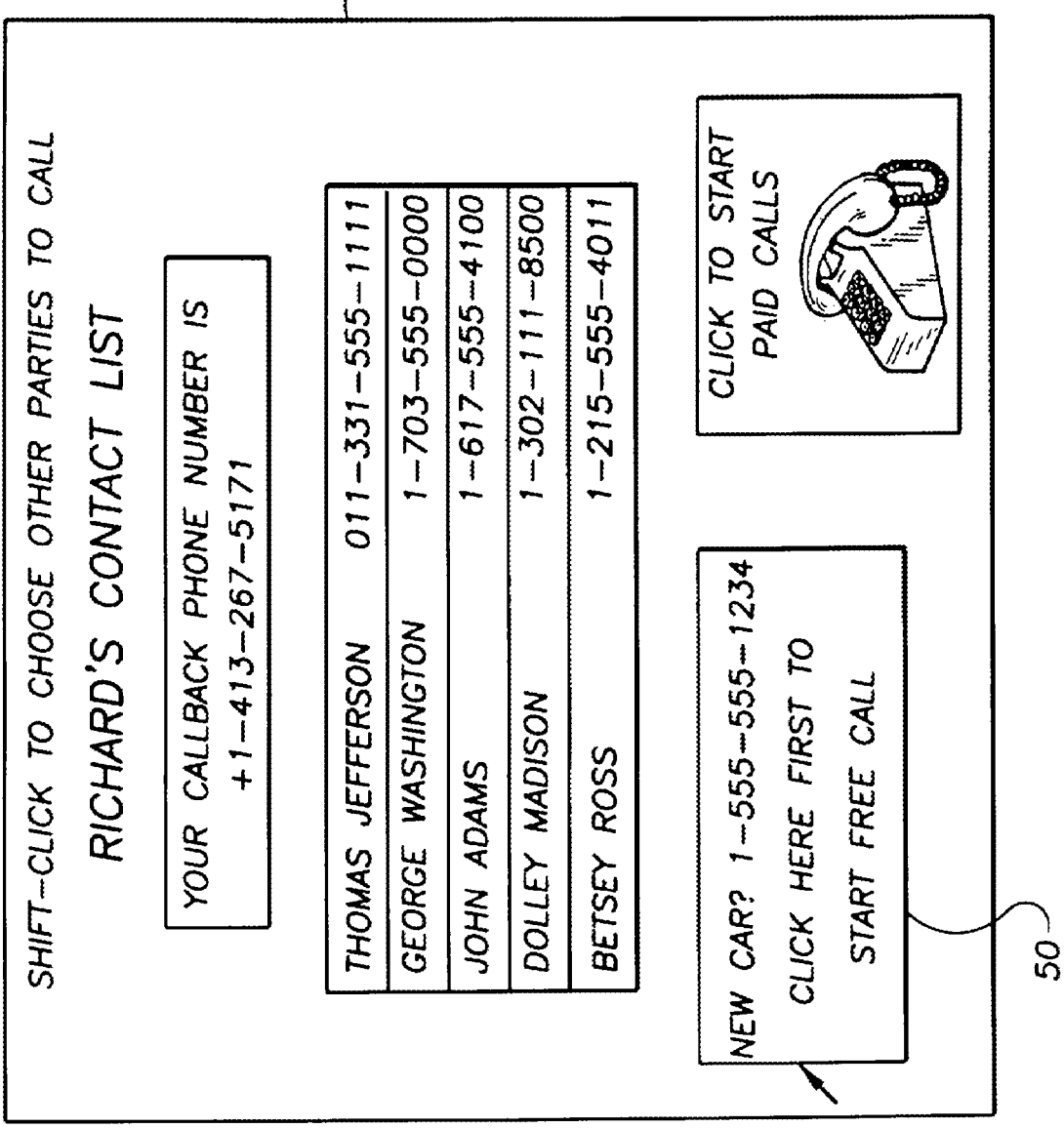
FIG. 3 is a drawing of a second embodiment of a computer display according to the invention.

In a third embodiment, the call-back system can be expanded to include an advertising feature. Referring to FIG. 3, a display 40' is expanded to include an advertising block 50. Under this embodiment, in order to place a call via the call-back system or activate a conference, the program requires clicking on the advertising block 50 by the caller to create a record that the advertisement was seen by the caller. Various subroutines can then be activated such as requiring additional periodic clicks on the advertisement to keep the call connected, or linking the caller to a web page of the advertiser providing additional information as to the users of the system.

It will be noted that the displays 40, 40' are to be implemented in various colors, and that the selection by clicking on any portion of the display will be highlighted in a manner known in the computer art.

The invention has been described in detail with particular reference to preferred embodiments thereof, but it will be understood that variations and modifications can be effected within the spirit and scope of the invention. For example, other data networks, such as a private intranet rather than the Internet, may be used for digital data communication among the conferee PCs, as well as other telephone signaling.

The embodiments of the invention in which an exclusive property or privilege is claimed are defined as follows:

1. A system for establishing a telephonic connection for a conference among a plurality of conferees, the system comprising:
   a digital computing device configured to control telephonic connections over a public Internet Protocol (IP) network; and
   a switch interface in communication with the digital computing device over the public IP network and further in communication with a dial up communication network, wherein the digital computing device is configured to transmit digital control signals to the switch interface over the public IP network,
   wherein the switch interface is configured to transmit telephonic control signals to the dial up communication network in response to the digital control signals to establish at least one telephonic connection for a conference among the plurality of conferees.

2. The system of claim 1, wherein the digital control signals include a telephone number associated with a conferee telephone device, and wherein the telephonic control signals cause the dial up communication network to dial up the conferee telephone device based upon the telephone number.

3. The system of claim 1, wherein the dial up communication network is an SS7 compatible dial up communication network, and wherein the telephonic control signals are SS7 telephonic control signals.

4. The system of claim 1, wherein the digital computing device transmits additional digital control signals to the switch interface to add a conferee to the conference, and
   wherein the switch interface transmits additional telephonic control signals to the dial up communication network in response to the additional digital control signals to establish a telephonic connection for the added conferee.

5. The system of claim 1, wherein, the digital computing device transmits additional digital control signals to the switch interface to remove a conferee from the conference, and
   wherein the switch interface transmits additional telephonic control signals to the dial up communication network in response to the additional digital control signals to disconnect a telephonic connection for the removed conferee.

6. The system of claim 1, wherein the public IP network is the Internet.

7. The system of claim 1, wherein the digital computing device is located at a conferee station.

8. The system of claim 1, wherein the digital computing device is a personal computer.

9. A method for establishing a telephonic connection for a conference among a plurality of conferees, the method comprising:
   receiving digital control signals from a digital computing device over a public Internet Protocol (IP) network; and transmitting telephonic control signals to a dial up communication network in response to the digital control signals to establish at least one telephonic connection for a conference among the plurality of conferees.

10. The method of claim 9, wherein the digital control signals include a telephone number associated with a conferee telephone device, and wherein the telephonic control signals cause the dial up communication network to dial up the conferee telephone device based upon the telephone number.

11. The method of claim 9, wherein the dial up communication network is an SS7 compatible dial up communication network, and wherein the telephonic control signals are SS7 telephonic control signals.

12. The method of claim 9, further comprising:
receiving additional digital control signals from the digital computing device over the public IP network to add a conferee to the conference; and
in response to receiving the additional digital control signals, transmitting additional telephonic control signals to the dial up communication network to establish a telephonic connection for the added conferee.

13. The method of claim 9, further comprising:
receiving additional digital control signals from the digital computing device over the public IP network in order to remove a conferee from the conference; and
in response to receiving the additional digital control signals, transmitting additional telephonic control signals to disconnect a telephonic connection for the removed conferee.

14. The method of claim 9, wherein the public IP network is the Internet.

15. The method of claim 9, wherein the digital computing device is located at a conferee station.

16. The method of claim 9, wherein the digital computing device is a personal computer.

17. A system for establishing a telephonic connection for a conference among a plurality of conferees, the system comprising:
a digital computing device configured to control telephonic connections over an Internet Protocol (IP) network; and
a switch interface in communication with the digital computing device over the IP network and further in communication with a dial up communication network, wherein the digital computing device is configured to transmit digital control signals to the switch interface over the IP network,
wherein the switch interface is configured to transmit telephonic control signals to the dial up communication network in response to the digital control signals to establish at least one telephonic connection for a conference among the plurality of conferees, and
wherein the digital computing device is further configured to monitor the at least one telephonic connection over the IP network.

18. The system of claim 17, wherein the digital computing device is further configured to transmit additional digital control signals to the switch interface to remove a conferee from the conference, and
wherein the switch interface is further configured to transmit additional telephonic control signals to the dial up communication network in response to the additional digital control signals to disconnect a telephonic connection for the removed conferee.

19. The system of claim 17, wherein the digital computing device is located at a conferee station.

20. The system of claim 17, wherein the digital computing device is a personal computer.

* * * * *